United States Patent
Nohara et al.

(10) Patent No.: US 6,882,925 B2
(45) Date of Patent: Apr. 19, 2005

(54) GEAR STAGE DETECTION DEVICE

(75) Inventors: Yasuhiro Nohara, Kawasaki (JP);
Kazuhiko Kobayashi, Kawasaki (JP);
Takumi Shinojima, Yokohama (JP)

(73) Assignees: Isuzu Motors Limited, Tokyo (JP);
Transtron, Inc., Kanagawa (JP)

( * ) Notice: Subject to any disclaimer, the term of this patent is extended or adjusted under 35 U.S.C. 154(b) by 26 days.

(21) Appl. No.: 10/606,572

(22) Filed: Jun. 26, 2003

(65) Prior Publication Data

US 2004/0083045 A1 Apr. 29, 2004

(30) Foreign Application Priority Data

Feb. 13, 2002 (JP) .......................................... 2002-35843
Feb. 15, 2002 (JP) .......................................... 2002-39119

(51) Int. Cl.$^7$ ............................................... G06F 7/00
(52) U.S. Cl. .......................... 701/101; 701/51; 477/118; 477/120
(58) Field of Search .............................. 701/101, 51, 54, 701/58, 62; 477/118, 120, 115, 97, 125

(56) References Cited

U.S. PATENT DOCUMENTS

| | | | | |
|---|---|---|---|---|
| 5,150,634 A | * | 9/1992 | Wakahara | .................... 477/125 |
| 5,674,151 A | * | 10/1997 | de Schepper et al. | ........ 477/120 |
| 5,855,532 A | * | 1/1999 | Sugiyama | ..................... 477/97 |
| 6,102,830 A | * | 8/2000 | Tsutsui et al. | .............. 477/143 |
| 6,463,375 B1 | * | 10/2002 | Matsubara et al. | ........... 701/54 |

FOREIGN PATENT DOCUMENTS

JP 04-171353 6/1992

* cited by examiner

*Primary Examiner*—Hieu T. Vo
(74) *Attorney, Agent, or Firm*—McCormick. Paulding & Huber LLP

(57) ABSTRACT

A gear stage detection device according to the present invention comprises output shaft side pulse generating mechanism (21) for generating a pulse in a number which corresponds to a rotary phase of an output shaft (9) of a transmission (T/M), input shaft side pulse generating mechanism (20) for generating a pulse in a number which corresponds to a rotary phase of an input shaft (8) of the transmission (T/M), and gear stage determining mechanism (16) for determining the current gear stage by inputting the output shaft side pulse and input shaft side pulse generated respectively by the pulse generating mechanism, counting the number of input shaft side pulses generated when a unitary number (25 pls) of output shaft side pulses has been reached, and comparing the counted input shaft side pulse number with the unitary number of input shaft side pulses which is predetermined for each gear stage of the transmission.

16 Claims, 17 Drawing Sheets

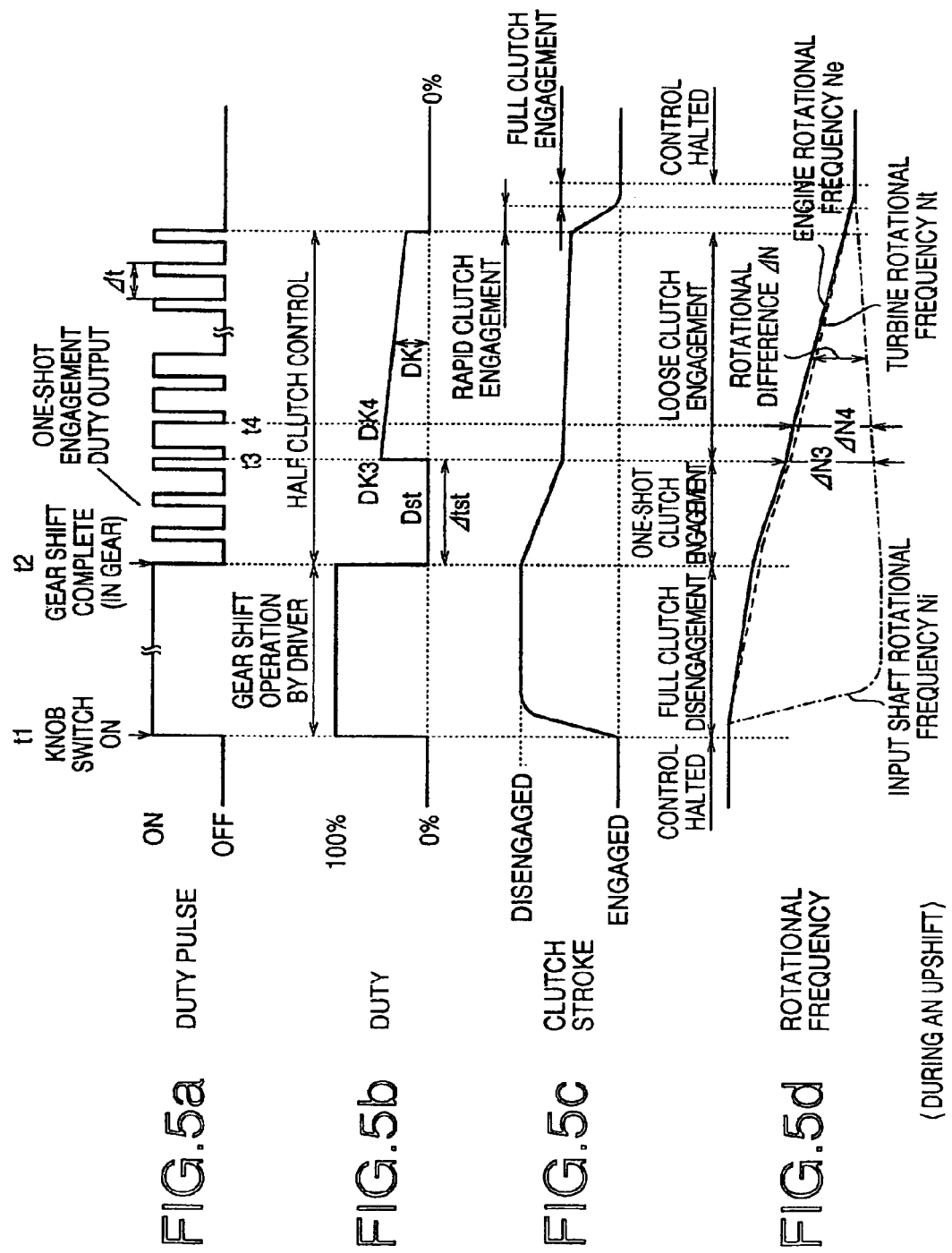

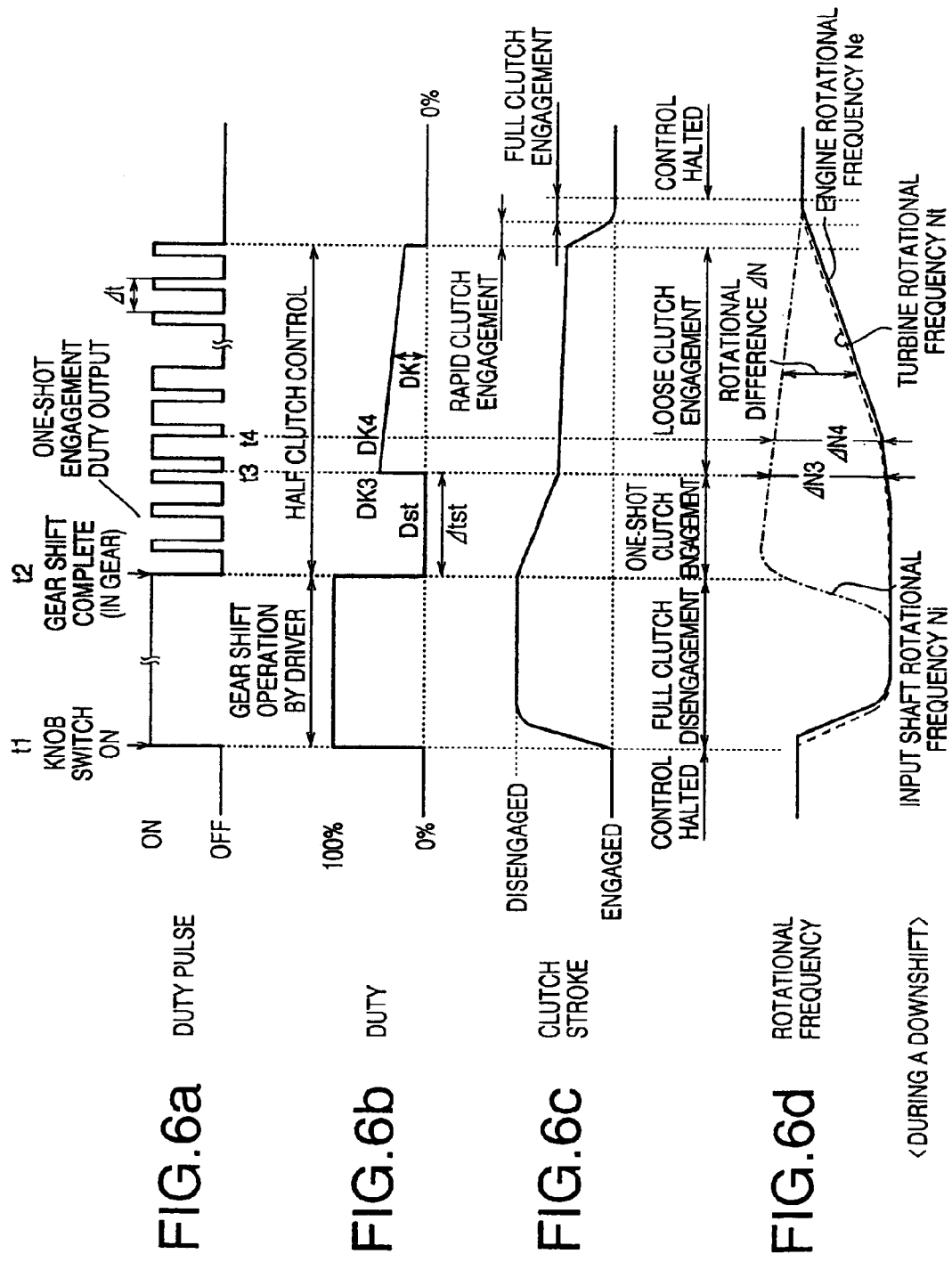

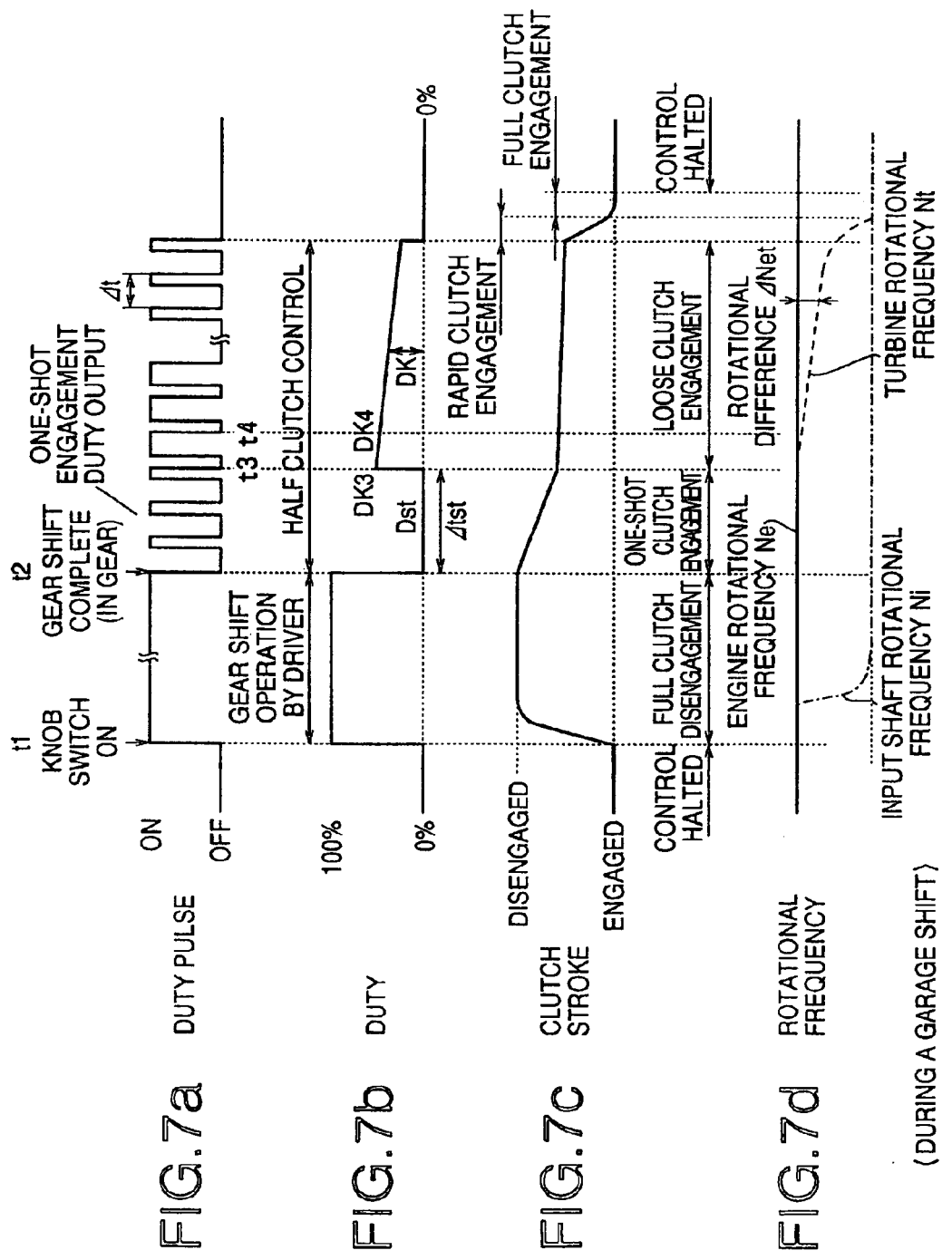

| Ds \ Gear Stage | 160rpm | 320rpm | 480rpm | 640rpm | 800rpm | 960rpm | 1120rpm | 1280rpm |
|---|---|---|---|---|---|---|---|---|
| R GEAR | 0005(H) | 0030(H) | 0040(H) | 0050(H) | 0060(H) | 0070(H) | 0080(H) | 0090(H) |
| 1st SPEED | 0005(H) | 0030(H) | 0030(H) | 0030(H) | 0040(H) | 0040(H) | 0040(H) | 0050(H) |
| 2nd SPEED | 0005(H) | 0030(H) | 0030(H) | 0030(H) | 0040(H) | 0040(H) | 0040(H) | 0050(H) |
| 3rd SPEED | 0005(H) | 0050(H) | 0060(H) | 0070(H) | 0080(H) | 0090(H) | 00A0(H) | 00B0(H) |
| 4th SPEED | 0100(H) | 0100(H) | 0100(H) | 0100(H) | 0100(H) | 0200(H) | 0300(H) | 0400(H) |
| 5th SPEED | 0100(H) | 0100(H) | 0100(H) | 0100(H) | 0100(H) | 0200(H) | 0300(H) | 0400(H) |
| 6th SPEED | 0100(H) | 0100(H) | 0100(H) | 0100(H) | 0100(H) | 0200(H) | 0300(H) | 0400(H) |

<DURING AN UPSHIFT>

| Ds \ Gear Stage | 160rpm | 320rpm | 480rpm | 640rpm | 800rpm | 960rpm | 1120rpm | 1280rpm |
|---|---|---|---|---|---|---|---|---|
| R GEAR | 0005(H) | 0008(H) | 0008(H) | 0008(H) | 0010(H) | 0020(H) | 0030(H) | 0030(H) |
| 1st SPEED | 0005(H) | 0005(H) | 0008(H) | 0008(H) | 0010(H) | 0020(H) | 0030(H) | 0030(H) |
| 2nd SPEED | 0005(H) | 0005(H) | 0008(H) | 0008(H) | 0010(H) | 0020(H) | 0030(H) | 0030(H) |
| 3rd SPEED | 0005(H) | 0005(H) | 0010(H) | 0010(H) | 0020(H) | 0030(H) | 0040(H) | 0050(H) |
| 4th SPEED | 0005(H) | 0800(H) | 0100(H) | 0200(H) | 0100(H) | 0100(H) | 0080(H) | 0080(H) |
| 5th SPEED | 0100(H) | 0200(H) | 0200(H) | 0200(H) | 0100(H) | 0100(H) | 0080(H) | 0080(H) |
| 6th SPEED | 0100(H) | 0200(H) | 0200(H) | 0200(H) | 0100(H) | 0100(H) | 0080(H) | 0080(H) |

<DURING A DOWNSHIFT>

| Ds \ Gear Stage | 0rpm | 40rpm | 80rpm | 120rpm | 160rpm | 200rpm | 240rpm | 280rpm |
|---|---|---|---|---|---|---|---|---|
| R GEAR | 0040(H) | 0030(H) | 0020(H) | 0010(H) | 0010(H) | 0010(H) | 00A0(H) | 0000(H) |
| 1st SPEED | 0040(H) | 0030(H) | 0020(H) | 0010(H) | 0010(H) | 0010(H) | 00A0(H) | 0000(H) |
| 2nd SPEED | 0040(H) | 0030(H) | 0020(H) | 0010(H) | 0010(H) | 0010(H) | 00A0(H) | 0000(H) |
| 3rd SPEED | 0040(H) | 0030(H) | 0020(H) | 0010(H) | 0010(H) | 0010(H) | 00A0(H) | 0000(H) |
| 4th SPEED | 0040(H) | 0030(H) | 0020(H) | 0010(H) | 0010(H) | 0010(H) | 00A0(H) | 0000(H) |
| 5th SPEED | 0040(H) | 0030(H) | 0020(H) | 0010(H) | 0010(H) | 0010(H) | 00A0(H) | 0000(H) |
| 6th SPEED | 0040(H) | 0030(H) | 0020(H) | 0010(H) | 0010(H) | 0010(H) | 00A0(H) | 0000(H) |

<DURING A GARAGE SHIFT>

FIG.13a

| GEAR STAGE | GEAR RATIO (REDUCTION GEAR RATIO)GR | (Nd) |
|---|---|---|
| Rev | 5.068 | 69.0 |
| 1st | 5.315 | 69.0 |
| 2nd | 2.908 | 69.0 |
| 3rd | 1.558 | 69.0 |
| 4th | 1.000 | 70.0 |
| 5th | 0.721 | 69.0 |

FIG.13b

| PTM |
|---|
| 354.0 |
| 372.0 |
| 203.0 |
| 109.0 |
| 70.0 |
| 50.0 |

FIG.17

| GEAR STAGE | REDUCTION GEAR RATIO | | NUMBER OF TEETH OF DRIVEN GEAR | | | | | | | | | | |
|---|---|---|---|---|---|---|---|---|---|---|---|---|---|
| | | | 10 | | 11 | | 12 | | 13 | | ... | 17 | |
| | | | PTM | Nd | PTM | Nd | PTM | Nd | PTM | Nd | | PTM | Nd |
| Rev | 5.701 | | 394.0 | 69.0 | 434.0 | 76.0 | 474.0 | 83.0 | 514.0 | 90.0 | ... | 668.0 | 117.0 |
| 1st | 5.979 | | 413.0 | 69.0 | 455.0 | 76.0 | 497.0 | 83.0 | 539.0 | 90.0 | ... | 706.0 | 118.0 |
| 2nd | 3.434 | | 237.0 | 69.0 | 261.0 | 76.0 | 286.0 | 83.0 | 310.0 | 90.0 | ... | 406.0 | 118.0 |
| 3rd | 1.862 | | 129.0 | 69.0 | 142.0 | 76.0 | 155.0 | 83.0 | 168.0 | 90.0 | ... | 220.0 | 118.0 |
| 4th | 1.297 | | 90.0 | 69.0 | 99.0 | 76.0 | 108.0 | 83.0 | 117.0 | 90.0 | ... | 154.0 | 118.0 |
| 5th | 1.000 | | 70.0 | 70.0 | 76.0 | 76.0 | 84.0 | 84.0 | 90.0 | 90.0 | ... | 118.0 | 118.0 |
| 6th | 0.774 | | 54.0 | 69.0 | 59.0 | 76.0 | 65.0 | 83.0 | 70.0 | 90.0 | ... | 92.0 | 118.0 |
| FAIL | | 2nd | 394.0 | 114.0 | 434.0 | 126.0 | 474.0 | 138.0 | 514.0 | 149.0 | ... | 668.0 | 194.0 |
| | | 3rd | 413.0 | 221.0 | 455.0 | 244.0 | 497.0 | 266.0 | 539.0 | 289.0 | ... | 706.0 | 379.0 |
| | | 2nd | 90.0 | 26.0 | 99.0 | 28.0 | 108.0 | 31.0 | 117.0 | 34.0 | ... | 154.0 | 44.0 |
| | | 3rd | 70.0 | 37.0 | 76.0 | 40.0 | 84.0 | 45.0 | 90.0 | 48.0 | ... | 118.0 | 63.0 |
| | | 2nd | 54.0 | 15.0 | 59.0 | 17.0 | 65.0 | 18.0 | 70.0 | 20.0 | ... | 92.0 | 26.0 |

FIG.18

| GEAR STAGE | REDUCTION GEAR RATIO | NUMBER OF TEETH OF DRIVEN GEAR | | | | | | | | | | | | |
|---|---|---|---|---|---|---|---|---|---|---|---|---|---|---|
| | | 10 | | 11 | | 12 | | 13 | | ... | 17 | |
| | | PTM | Nd | PTM | Nd | PTM | Nd | PTM | Nd | | PTM | Nd |
| Rev | 5.068 | 354.0 | 69.0 | 390.0 | 76.0 | 425.0 | 83.0 | 461.0 | 90.0 | ... | 632.0 | 117.0 |
| 1st | 5.315 | 372.0 | 69.0 | 409.0 | 76.0 | 446.0 | 83.0 | 483.0 | 90.0 | ... | 632.0 | 118.0 |
| 2nd | 2.908 | 203.0 | 69.0 | 223.0 | 76.0 | 244.0 | 83.0 | 264.0 | 90.0 | ... | 346.0 | 118.0 |
| 3rd | 1.558 | 109.0 | 69.0 | 119.0 | 76.0 | 130.0 | 83.0 | 141.0 | 90.0 | ... | 185.0 | 118.0 |
| 4th | 1.000 | 70.0 | 70.0 | 77.0 | 77.0 | 84.0 | 84.0 | 91.0 | 91.0 | ... | 119.0 | 118.0 |
| 5th | 0.721 | 50.0 | 69.0 | 76.0 | 76.0 | 60.0 | 83.0 | 65.0 | 90.0 | ... | 85.0 | 118.0 |
| 6th | | | | | | | | | | ... | | |
| FAIL | Rev 2nd | 354.0 | 121.0 | 390.0 | 134.0 | 425.0 | 146.0 | 461.0 | 158.0 | ... | 603.0 | 207.0 |
| | 1ST 3rd | 372.0 | 238.0 | 409.0 | 255.0 | 446.0 | 255.0 | 483.0 | 255.0 | ... | 632.0 | 255.0 |
| | 4TH 2nd | 70.0 | 24.0 | 77.0 | 26.0 | 84.0 | 28.0 | 91.0 | 31.0 | ... | 119.0 | 40.0 |
| | 5TH 3rd | 50.0 | 32.0 | 55.0 | 35.0 | 60.0 | 38.0 | 65.0 | 41.0 | ... | 85.0 | 54.0 |

| Z<br>TM TYPE | Dri(5th) | | 4th | | 3rd | | 2nd | | 1st | | Rev | | 6th | |
|---|---|---|---|---|---|---|---|---|---|---|---|---|---|---|
| | M | C | M | C | M | C | M | C | M | C | M | C | M | C |
| C TYPE | ZM5 | ZC5 | ZM4 | ZC4 | ZM3 | ZMC | ZM2 | ZC2 | ZM1 | ZC1 | ZMR | ZCR | ZM6 | ZC6 |
| D TYPE | ZM5 | ZC5 | ZM4 | ZC4 | ZM3' | ZC3' | ZM2 | ZC2 | ZM1 | ZC1 | ZMR | ZC5 | ZM6' | ZC6' |

# GEAR STAGE DETECTION DEVICE

CROSS REFERENCES TO RELATED APPLICATIONS

The present invention claims priority from Japanese Patent Application No. 2002-035843 (filed Feb. 13, 2002) and Japanese Patent Application No. 2002-039119 (filed Feb. 15, 2002). The content of these Japanese applications is hereby incorporated in the specification of the present application by reference.

BACKGROUND OF THE INVENTION

1. Field of the Invention

The present invention relates to a gear stage detection device, and more particularly to a device for indirectly detecting a gear stage and gear position of a vehicle transmission without recourse to a gear position sensor.

2. Description of the Related Art

The present inventors have newly developed a power transmission device for a vehicle in which a fluid coupling (including a torque converter) which may be locked up and a friction type gear shift clutch are provided in series between an engine and a transmission such that the speed shift clutch is engaged and disengaged automatically during a gear shift. In this case, during a gear shift the clutch is automatically disengaged at the beginning of gear disengagement, and the clutch is automatically engaged when the gear is engaged.

Since clutch control is performed in accordance with the gear stage position of the transmission in this manner, and also since the method of controlling clutch engagement and disengagement (snore specifically the engagement/disengagement speed, engagement/disengagement amount, and so on) may change at each gear stage, a gear position sensor is provided in the transmission for detecting the gear stage. When the gear stage is detected by the gear position sensor alone, however, problems occur such as clutch control becoming impossible when the sensor is broken, and hence this is not a failsafe solution. As a backup thereto, a method is disclosed in Japanese Patent Application Laid-Open Publication No. H4-171353 for determining the current gear stage using the outputs of a vehicle speed sensor and an input shaft rotation sensor.

According to the technology disclosed in this publication, however, a predetermined calculation is performed by converting the output of each sensor into a rotational frequency per time unit, or in other words a rotation speed. Although this is not problematic at comparatively high vehicle speeds, when the vehicle speed is comparatively low similar values are obtained for the rotational frequency of the transmission, causing the margin of error between the actual value and the calculated value to increase such that misjudgments of the gear stage may occur.

SUMMARY OF THE INVENTION

An object of the present invention is to provide a gear stage detection device which is capable of determining a gear stage at low vehicle speeds with improved accuracy.

A gear stage detection device according to one aspect of the present invention comprises output shaft side pulse generating means for generating a pulse in a number which corresponds to a rotary phase of an output shaft of a transmission, input shaft side pulse generating means for generating a pulse in a number which corresponds to a rotary phase of an input shaft of the transmission, and gear stage determining means for determining the current gear stage by inputting the output shaft side pulse and input shaft side pulse generated by the respective pulse generating means, counting the number of one of the pulses when a unitary number of the other pulse has been reached, and comparing the counted number of the one pulse with the unitary number of the other pulse which is predetermined for each gear stage of the transmission.

Here, the one pulse may be the input shaft side pulse and the other pulse may be the output shaft side pulse.

A gear stage detection device according to another aspect of the present invention comprises a vehicle speed sensor for generating a vehicle speed pulse in a number which corresponds to a rotary phase of an output shaft of a transmission and which is rotationally driven by the output shaft via a meter gear, a transmission rotation sensor for generating a transmission pulse in a number which corresponds to a rotary phase of an input shaft of the transmission, and gear stage determining means which input the vehicle speed pulse and transmission pulse respectively, store in advance a gear ratio of each gear stage of the transmission, a gear ratio of the meter gear, and the number of teeth of an input main gear of the transmission, count the number of transmission pulses generated by the transmission rotation sensor during the generation of a predetermined unitary number of vehicle speed pulses by the vehicle speed sensor, and determine the current gear stage on the basis of at least the counted transmission pulse number and the pre-stored gear ratio of each gear stage, gear ratio of the meter gear, and number of teeth of the input main gear.

Here, the unitary number may be the number of pulses generated during one revolution of the vehicle speed sensor, and the gear stage determining means may insert the counted transmission pulse number and successively insert the gear ratio of each gear stage into the following equation 1×(gear ratio of meter gear)×(gear ratio of each gear stage)×(number of teeth of input main gear)=(counted transmission pulse number)

such that the resultant gear stage upon the substantial establishment of the equation is determined as the current gear stage.

A gear stage detection device according to another aspect of the present invention comprises a vehicle speed sensor for generating a vehicle speed pulse in a number which corresponds to a rotary phase of an output shaft of a transmission and which is rotationally driven by the output shaft via a meter gear, a transmission rotation sensor for generating a transmission pulse in a number which corresponds to a rotary phase of an input shaft of the transmission, and gear stage determining means which input the vehicle speed pulse and transmission pulse respectively, store in advance the gear ratio of each gear stage of the transmission and a predetermined value obtained by multiplying the number of teeth of an input main gear of the transmission by the gear ratio of the meter gear, count the number of transmission pulses generated by the transmission rotation sensor during the generation of a predetermined unitary number of vehicle speed pulses by the vehicle speed sensor, and determine the current gear stage on the basis of at least the counted transmission pulse number, the gear ratio of each gear stage, and the predetermined value.

Here, the unitary number may be the number of pulses generated during one revolution of the vehicle speed sensor, and the gear stage determining means may insert the counted transmission pulse number and successively insert the gear ratio of each gear stage into the following equation (predetermined value)=(counted transmission pulse number)/(gear ratio of each gear stage)

such that the resultant gear stage upon the substantial establishment of the equation is determined to be the current gear stage.

Alternatively, the unitary number may be the number of pulses generated during one revolution of the vehicle speed sensor, and the gear stage determining means may compare a value obtained by dividing the counted transmission pulse number by the predetermined value to the gear ratio of each gear stage to thereby determine the current gear stage as the gear stage having a gear ratio which substantially matches the value.

Further, the gear stage determining means may input the vehicle speed pulse via a pulse matching unit, this pulse matching unit being a device for adjusting the time interval of the vehicle speed pulse inputted therein from the vehicle speed sensor using a predetermined correction coefficient and then outputting the pulse to the gear stage determining means, whereby the current gear stage is also determined on the basis of the correction coefficient.

A gear stage detection method according to an aspect of the present invention detects a current gear stage by generating a pulse in a number which corresponds to a rotary phase of an output shaft of a transmission, generating a pulse in a number which corresponds to a rotary phase of an input shaft of the transmission, counting the number of one of the pulses when a unitary number of the other pulse has been reached, and comparing the counted number of the one pulse with the unitary number of the other pulse which is predetermined for each gear stage of the transmission.

According to a further aspect of the present invention, a gear stage detection device is provided comprising a vehicle speed sensor for generating a pulse in a number which corresponds to a rotary phase of an output shaft of a transmission and which is rotationally driven by the output shaft via a meter gear, a transmission rotation sensor for generating a pulse in a number which corresponds to a rotary phase of an input shaft of the transmission, and gear stage determining means which input the pulses respectively generated by the sensors, count a number of one of the pulses when a unitary number of the other pulse has been reached, and determine the current gear stage from the counted number of the one pulse. In this gear stage detection device, data regarding the counted value of the one pulse number based on the gear ratio of each gear stage of the transmission and a plurality of gear ratios of the meter gear are stored as a map in advance in the gear stage determining means, a gear ratio of the meter gear installed in the transmission is specified from the map, and the current gear stage is determined from the map containing the counted value data which corresponds to the specified meter gear ratio.

Here, the number of transmission pulses generated by the transmission rotation sensor upon the generation of the unitary number of pulses by the vehicle speed sensor may be stored in the map for each gear stage of the transmission, and this transmission pulse number may be stored therein for each of a plurality of values (Nd) obtained by dividing the transmission pulse number by the transmission gear ratio in accordance with the gear ratio of the meter gear.

Further, the value of Nd may be determined by dividing the transmission pulse number inputted from the transmission rotation sensor by the gear ratio of the current gear stage, the meter gear ratio may be determined from the Nd value, and the current gear stage may be determined from the map which corresponds to the determined meter gear ratio.

Further, a pulse matching unit for correcting the signal of the vehicle speed sensor on the basis of differences in tire radius of movement, final gear ratio, and so on, may be connected between the vehicle speed sensor and gear stage determining means, and [the signal of] the vehicle speed sensor corrected by the pulse matching unit and a correction coefficient ($\alpha$) may be inputted into the gear stage determining means such that the meter gear ratio and current gear stage are determined from a map by multiplying the correction coefficient ($\alpha$) by the transmission pulse number.

Moreover, transmission pulse number data for a plurality of types of transmission in which the gear ratios of the transmission differ at predetermined stages and match at the other stages may be stored in the map, the meter gear ratio may be determined when the transmission is in the other gear stages, the type of transmission may then be determined from the transmission pulse number at the predetermined stages, and the current gear stage may be determined using the map of the determined type.

Following the determination of the meter gear ratio using the map, the gear stage determining means may raise a flag indicating that the map based on the meter gear ratio has been learned, and a judgment regarding a breakdown of a gear position sensor need be performed only when the flag is raised.

BRIEF DESCRIPTION OF THE DRAWINGS

FIG. 5 is a time chart showing the content of clutch connection control according to this embodiment during an upshift.

FIG. 6 is a time chart showing the content of clutch connection control according to this embodiment during a downshift.

FIG. 7 is a time chart showing the content of clutch connection control according to this embodiment during a garage shift.

FIG. 8 is a step duty calculation map for an upshift according to this embodiment.

FIG. 9 is a step duty calculation map for a downshift according to this embodiment.

FIG. 10 is a step duty calculation map for a garage shift according to this embodiment.

FIG. 13a shows specific values, such as the gear ratio of each gear stage, used in gear stage detection.

FIG. 13b shows specific values, such as the gear ratio of each gear stage, used in gear stage detection.

FIG. 17 is a detailed view showing an example of a map stored in an ECU in this embodiment.

FIG. 18 is a detailed view showing another example of a map stored in an ECU in this embodiment.

DESCRIPTION OF THE PREFERRED EMBODIMENTS

Preferred embodiments of the present invention will be described below on the basis of the attached drawings.

Figure 1:
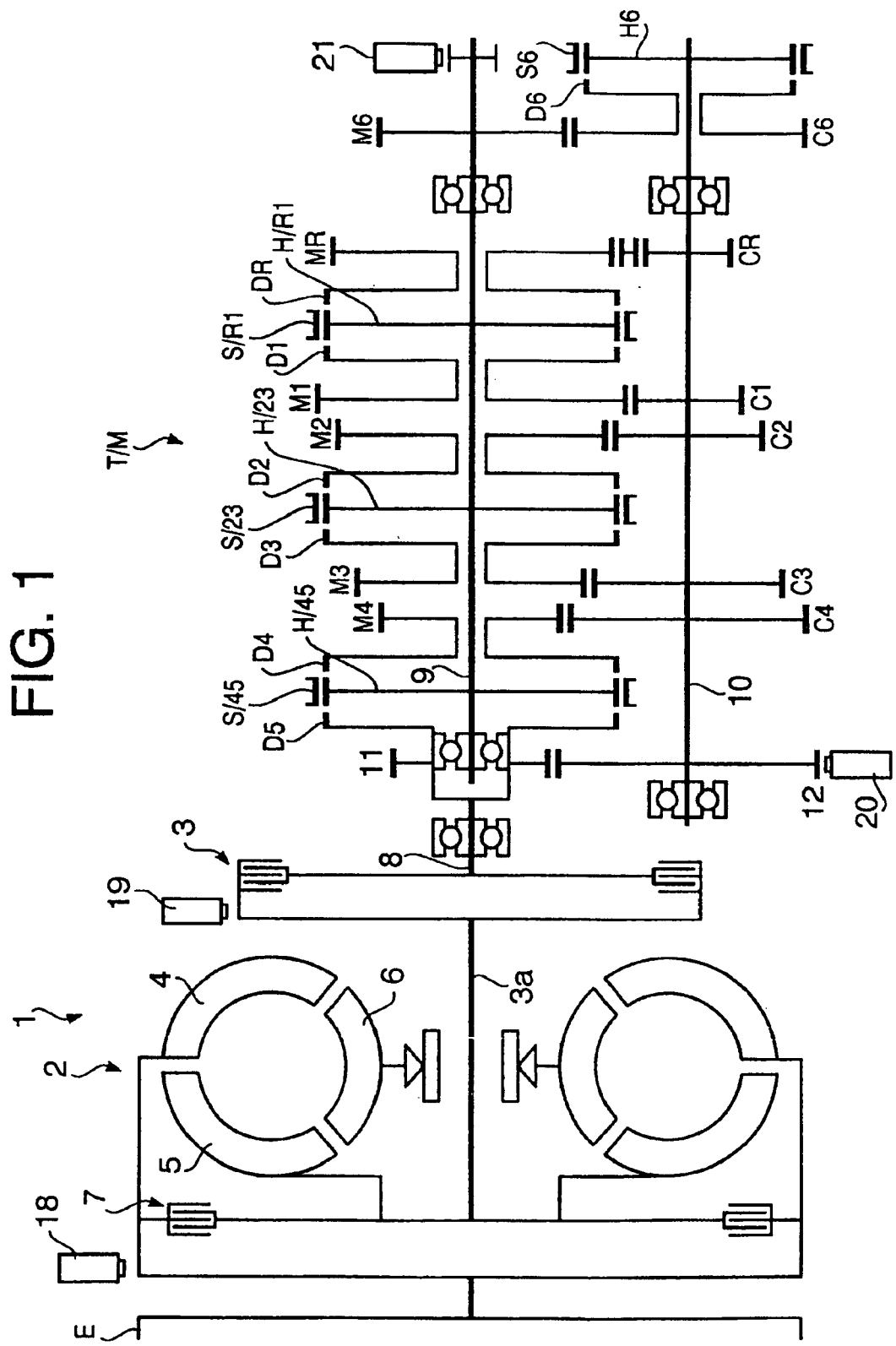
FIG. 1 is a skeleton diagram showing a power transmission device for a vehicle according to an embodiment of the present invention.

FIG. 1 shows a power transmission device for a vehicle to which the present invention is applied. As shown in the drawing, a clutch mechanism 1 is provided between an engine E and a transmission T/M. The clutch mechanism 1 comprises a fluid coupling 2 provided on the upstream side in the power transmission direction, and a gear shift clutch 3 provided in series therewith on the downstream side thereof and constituted by a friction clutch which in this embodiment is a wet type multiple disk clutch. What is noted here as a fluid coupling is a broad concept including a torque converter, and in actual fact a torque converter is used in this embodiment. The vehicle to which the present invention is applied is a comparatively large vehicle such as a truck. The engine E is a diesel engine.

The fluid coupling 2 comprises a pump 4 which is connected to an output shaft (crankshaft) of the engine, a turbine 5 which opposes the pump 4 and is connected to the input side of the clutch 3, and a stator 6 which is interposed between the turbine 5 and pump 4. A lockup clutch 7 is provided in parallel with the fluid coupling 2 to connect and disconnect the pump 4 and turbine 5, thereby enabling lockup of the fluid coupling 2. The input side of the gear shift clutch 3 is connected to the turbine 5 via an input shaft 3a, and the output side thereof is connected to an input shaft 8 of the transmission T/M. Thus the gear shift clutch 3 connects and disconnects the fluid coupling 2 and transmission T/M.

The transmission T/M comprises an input shaft 8, an output shaft 9 disposed coaxially therewith, and a countershaft 10 disposed parallel thereto. An input main gear 11 is provided on the input shaft 8. A first speed main gear M1, a second speed main gear M2, a third speed main gear M3, a fourth speed main gear M4, and a reverse main gear MR are respectively axially supported on the output shaft 9, and a sixth speed main gear M6 is fixed thereto. An input counter gear 12 which is meshed with the input main gear 11, a first speed counter gear C1 which is meshed with the first speed main gear M1, a second speed counter gear C2 which is meshed with the second speed main gear M2, a third speed counter gear C3 which is meshed with the third speed main gear M3, a fourth speed counter gear C4 which is meshed with the fourth speed main gear M4, and a reverse counter gear CR which is meshed with the reverse main gear MR via an idling gear IR are fixed onto the countershaft 10, and a sixth speed counter gear C6 which is meshed with the sixth speed main gear M6 is axially supported thereon.

In this transmission T/M, when a sleeve S/R1 which is spline meshed with a hub H/R1 fixed to the output shaft 9 is spline meshed with a dog DR of the reverse main gear MR, the output shaft 9 rotates in reverse, and when this sleeve S/R1 is spline meshed with a dog D1 of the first speed main gear M1, the output shaft 9 rotates in first speed. When a sleeve S/23 which is spline meshed with a hub H/23 fixed to the output shaft 9 is spline meshed with a dog D2 of the second speed main gear M2, the output shaft 9 rotates at second speed, and when this sleeve S/23 is spline meshed with a dog D3 of the third speed gear M3, the output shaft 9 rotates at third speed.

When a sleeve S/45 which is spline meshed with a hub H/45 fixed to the output shaft 9 is spline meshed with a dog D4 of the fourth speed main gear M4, the output shaft 9 rotates at fourth speed, and when this sleeve S/45 is spline meshed with a dog D5 of the input main gear 11, the output shaft 9 rotates at fifth speed (direct drive). When a sleeve S6 which is spline meshed with a hub H6 fixed to the countershaft 10 is spline meshed with a dog D6 of the sixth speed counter gear C6, the output shaft 9 rotates at sixth speed. All of the aforementioned sleeves are manually operated by a driver using a shift lever in the driving cab via a shift fork and shift rod (not shown). In other words, the transmission T/M is manual.

Figure 2:
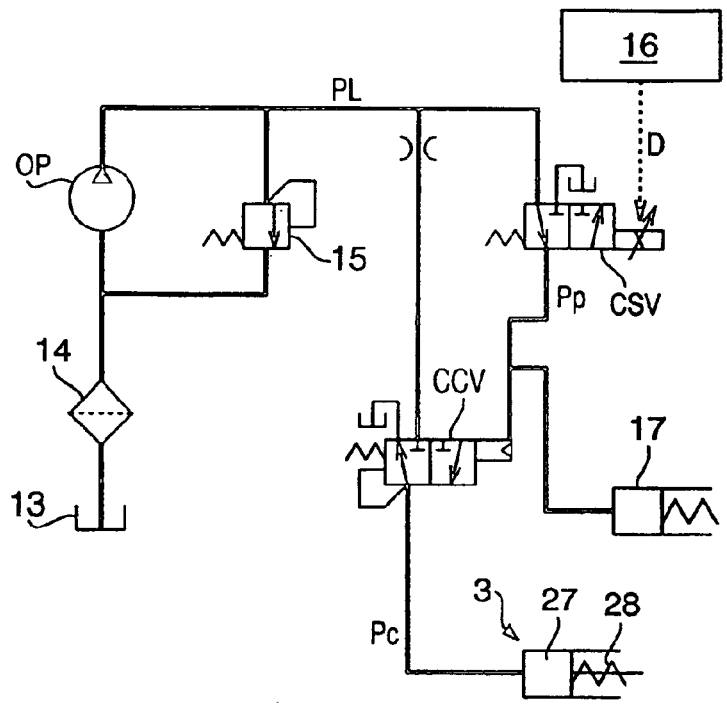
FIG. 2 is a hydraulic circuit diagram showing an oil pressure supply device according to this embodiment.

The gear shift clutch 3 is of a typical wet type multiple disk constitution. That is, although not shown in the drawing, a plurality of clutch plates are each spline meshed alternately on the input side and output side inside a clutch casing filled with oil. These clutch plates are pressed together or released by a clutch piston, thereby performing clutch engagement and disengagement. Referring to FIG. 2, the clutch piston 27 is always urged toward the disengagement side by a clutch spring 28, and when oil pressure that is greater than the urging force of the clutch spring 28 is applied to the clutch piston 27, the clutch 3 is engaged. The clutch engagement force and the torque capacity of the clutch increase in accordance with the applied oil pressure.

An oil pressure supply device for supplying operating oil pressure to the gear shift clutch 3 will now be explained. As is illustrated in FIG. 2, the oil in an oil tank 13 is aspirated and discharged by a hydraulic pump OP via a filter 14, and the resultant discharge pressure is adjusted by a relief valve 15 such that a constant line pressure PL is created. The oil at this line pressure PL is fed to the clutch 3 following pressure control to reduce the pressure thereof, two valves, a clutch control valve CCV and a clutch solenoid valve CSV, being used therefor. In other words, a pilot operation-type oil pressure control system is employed in which the clutch control valve CCV connected to the main oil pressure line is caused to open and close in accordance with pilot oil pressure Pp transmitted from the clutch solenoid valve CSV. The magnitude of the pilot oil pressure Pp is varied in accordance with a duty pulse outputted from an electronic control unit (to be referred to as "ECU" hereinafter) 16.

The clutch solenoid valve CSV is an electromagnetic valve having an electromagnetic solenoid which opens and doses in accordance with the ON/OFF of a duty pulse signal outputted from the ECU 16 and to which the line pressure PL is constantly supplied. A pilot oil pressure Pp is outputted in accordance with the duty (duty ratio) D of the duty pulse.

The clutch control valve CCV is a spool valve which is continuously controlled on the basis of the pilot oil pressure Pp, and is therefore not subject to electronic control itself. That is, an in-built spool is caused to stroke to the release side in accordance with the magnitude of the pilot oil pressure Pp, whereby the line pressure PL is appropriately adjusted and fed to the clutch 3 as a clutch pressure Pc. As a result, the oil pressure supplied to the clutch 3 is duty controlled by the ECU 16.

Note that an accumulator 17 is provided at a point on the path which connects the clutch solenoid valve CSV and the clutch control valve CCV.

Figure 3:
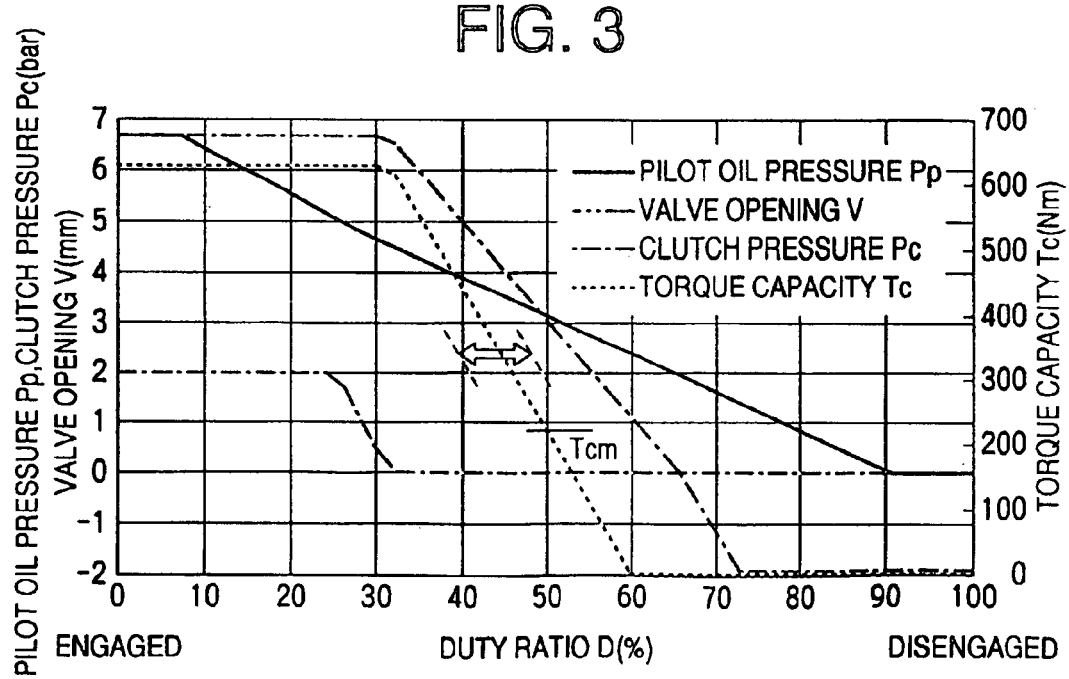
FIG. 3 is a line diagram showing a characteristic of the oil pressure supply device according to this embodiment.

FIG. 3 is a line diagram showing a characteristic of the oil pressure supply device. The abscissa is the duty D of the duty pulse outputted from the ECU 16, or more specifically the ON duty indicating the proportion of solenoid ON time in a basic control cycle (which in this embodiment is 20 msec). In this embodiment, the clutch is set so as to be filly engaged when the duty D is 0(%). This is so that vehicle motion can be maintained with the clutch in a state of engagement even when no electric current is being supplied to the clutch solenoid valve CSV (a so-called OFF stack state) due to a breakdown or the like of the electric system.

As illustrated in the drawing, the clutch 3 becomes more disengaged as the duty D increases and more engaged as the duty D decreases. As the value of the duty D becomes smaller, the value of the pilot oil pressure Pp outputted from the clutch control valve CCV increases proportionately, and consequently the oil pressure which is supplied to the clutch, or in other words the clutch pressure Pc, and a torque capacity Tc of the clutch 3 tend also to increase proportionately. A valve opening V of the clutch control valve CCV has three positions in the drawing, and in actual fact, at the intermediate opening (valve opening 0 mm in the drawing) other than being filly opened and fully closed, the spool valve makes a minute stroke, whereby the clutch pressure Pc can be continuously modified.

A control system for the lockup clutch 7 also exists in this embodiment, but an explanation thereof is omitted here since it bears no direct relation to the present invention. The constitution of the oil pressure control system thereof is substantially identical to the oil pressure control system of the gear shift clutch 3.

Figure 4:
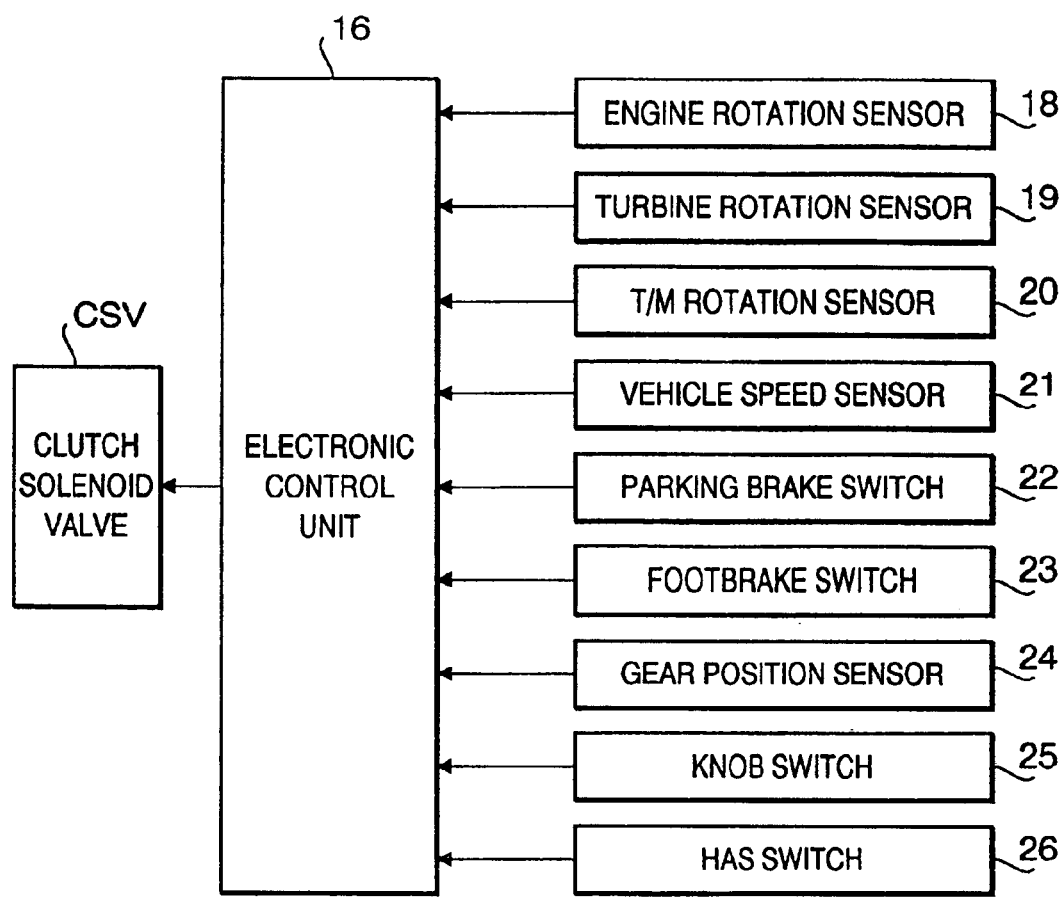
FIG. 4 is a block diagram showing an electronic control device according to this embodiment.

Next, an electronic control device for electronically controlling the power transmission device will be explained using FIG. 4. Various switches and sensors are connected to the aforementioned ECU 16 as well as the clutch solenoid valve CSV in order to electronically control this device. These include an engine rotation sensor 18 for detecting the engine rotation speed (more specifically the rotational frequency, as in the following cases also), a turbine rotation sensor 19 for detecting the rotation speed on the input side of the clutch 3, or in other words the rotation speed of the turbine 5, a transmission rotation sensor 20 for detecting the rotation speed of the transmission T/M, or more particularly the rotation speed of the input counter gear 12, and a vehicle speed sensor 21 for detecting the vehicle speed. These sensors are also illustrated in FIG. 1. In particular, the ECU 16 calculates the rotation speed of the input shaft 8 from the output of the transmission rotation sensor 20 and the gear ratio of the input main gear 11 and input counter gear 12, and this is set as the output side rotation speed of the clutch 3 and the input side rotation speed of the transmission T/M.

A parking brake switch 22 for detecting whether a parking brake is in operation or not, a foot brake switch 23 for determining whether a foot brake is in operation or not, and a gear position sensor 24 for detecting the gear position of the transmission are also connected to the ECU 16.

A knob switch 25 is also connected to the ECU 16. More specifically, in this embodiment, in order to detect the start time of a gear shift operation by a driver or to determine the start timing of clutch disengagement, a shift knob is attached to a shift lever in the driver's cab so as to be capable of slight oscillation in the shift direction, and the knob switch 25 is provided between the lever and the shift knob. When the shift knob oscillates prior to a lever operation during a gear shift operation by the driver, the knob switch 25 switches ON, in response to which clutch disengagement begins. The specific constitution of this device is similar to that disclosed in Japanese Patent Application Laid-Open Publication No. H11-236931.

A hill start aid (HSA) device which is disclosed in the same publication is also provided in the power transmission device of his embodiment, and an HSA switch 26 for performing a manual ON/OFF operation of this device is also provided in the driver's cab. The HSA switch 26 is connected to the ECU 16.

An operation and control method of the power transmission device according to this embodiment will now be explained.

In this power transmission device, the power of the engine E is transmitted to the fluid coupling 2, the gear shift clutch 3, and the transmission T/M sequentially. As a rule, the lockup clutch 7 is always ON (engaged) following start-up and OFF (disengaged) when the vehicle is stationary and during start-up. Thus, during vehicle start-up, the creep of the fluid coupling 2 can be used in a similar fashion to an AT automobile, whereby control becomes easier than performing start-up control of a friction clutch electronically, and loss due to slippage can be prevented due to the fact that the fluid coupling 2 is locked while the vehicle is in motion. The gear shift clutch 3 is disengaged and engaged automatically each time a gear shift is performed. This is similar to a typical AT automobile.

Here, the engagement/disengagement control of the lockup clutch 7 will be described in detail The lockup clutch 7 is engaged at or above a predetermined speed (in this embodiment approximately 10 km/h) which is a comparatively low vehicle speed. More precisely, lockup clutch engagement is performed when the rotational frequency of the input shaft at each gear stage reaches or exceeds a predetermined rotational frequency (in this embodiment, 900 rpm in all cases). When the vehicle starts up at the start-up stage (for example second speed, which is widely used as the start-up stage) and the rotational frequency of the input shaft reaches the predetermined rotational frequency (900 rpm), the lockup clutch is engaged and the vehicle speed at that time is a low vehicle speed (approximately 10 km/h).

First an operation upon vehicle start-up, or in other words a garage shift, will be described. It is assumed that the vehicle is stationary due to the gear being in neutral or a braking operation (including both the footbrake and parking brake), and that the driver is about to operate the shift lever to the start-up stage in order to advance. When this occurs, the shift knob oscillates prior to the lever operation of the shift lever, whereby the knob switch 25 is switched ON. In response thereto, the clutch 3 is automatically disengaged. When the shift lever is subsequently operated, the transmission T/M is shifted to the start-up stage, and when this is detected by the gear position sensor 24, the clutch 3 is automatically engaged. As a result of this engagement, the turbine 5 is stopped from the driving wheel side such that the pump 4 slides relative to the turbine 5 and a creep force is generated. Thereafter, the brake need only be released or the accelerator stepped upon for the vehicle to start moving.

Next, an operation to shift gear while the vehicle is in motion, or in other words an upshift or downshift, will be explained. It is assumed that the vehicle is moving at a predetermined gear stage and the driver is about to operate the shift lever to the next gear stage in order to shift speed. When this occurs, the shift knob oscillates prior to the lever operation whereby the knob switch 25 is switched ON. In response thereto, the clutch 3 is automatically disengaged. When the shift lever is subsequently operated, the transmission T/M is put into the next gear stage, and when this is detected by the gear position sensor 24, the clutch 3 is automatically engaged. The gear shift is thus completed. During this gear shift the lock-up clutch 7 remains ON and engine power continues to be transmitted to the clutch 3.

This clutch control method during vehicle motion will now be described in detail using FIGS. 5 and 6. FIG. 5 illustrates an upshift and FIG. 6 illustrates a downshift. First, an upshift will be described.

As shown in FIG. 5, the clutch is fully disengaged when the knob switch is switched ON (t1). Then, when the shift lever is operated to put the transmission T/M into the next gear stage, clutch engagement begins (t2).

First, one-shot engagement control is executed. That is, a starting duty (one-shot engagement duty) Dst at which the clutch 3 exceeds the torque point to become largely engaged in a fully engaged position is outputted from the ECU 16 during a waiting period Δtst, which is a short time period. Here, the starting duty Dst=0 (%), and the waiting period Δtst=0.1 sec.

Note that in conventional one-shot engagement control the starting duty Dst=approximately 60 (%) and the waiting period Δtst=0.5 sec. The reason for setting the starting duty Dst to approximately 60 (%) is that a torque point duty, to be described hereinafter, is around 50% and the clutch must be securely stopped just prior to the torque point. The reason for setting the waiting period Δtst to 0.5 sec is that such an amount of time is necessary to end an initial invalid stroke of the clutch and an increase in clutch pressure at a starting duty of approximately 60 (%).

In the one-shot engagement control in this case, however, the starting duty is further toward the engagement side than is conventional and is outputted for a shorter amount of time than is conventional. In so doing, the duty value is further toward the engagement side, and thus the amount of oil supplied to the clutch increases such that the clutch can be operated to the engagement side more rapidly. As conventional, on the other hand, the clutch itself must be stopped just before the torque point, and hence a waiting period Δtst at which this occurs is set by a time experiment. Thus a similar form of one-shot engagement to that performed conventionally can be achieved in a shorter amount of time, whereby the clutch engagement time can be reduced while preventing clutch engagement shock.

It is particularly preferable that the starting duty Dst be set to a value which is furthest toward the engagement side (a value corresponding to full engagement)=0 (%), as in his embodiment. This is in order to achieve the highest clutch engagement speed. It is also preferable that the stating duty Dst be set to a value in the vicinity thereof (for example 10 (%)). However, the starting duty Dst may be set at any value as long as this value is further toward the engagement side than the conventional starting duty. The value of the starting duty Dst may also be determined from a map or the like on the basis of the vehicle running conditions. The waiting time Δtst is not limited to 0.1 sec and may be set in accordance with the vehicle type. The value thereof may also be set at will.

Note that one-shot engagement control is open-loop control. The torque point of the clutch is a learned value which is stored in the ECU 16 as a duty value. For example, as shown in FIG. 3, a duty D=50 (%) indicating a torque capacity Tcm of approximately 200(Nm) is a torque point learned value. When the torque capacity line in the drawing shifts due to irregularities in the clutch or the like, as shown by the broken line, the torque point learned value alters in accordance therewith.

Following one-shot clutch engagement control, processing moves to loosen clutch engagement control (t3). That is, a loose engagement duty Dk, at which the clutch 3 is loosely engaged, is outputted from the ECU 16 at predetermined time intervals. In this embodiment, the predetermined time is equal to a control cycle Δt=20 msec. However, this time may be made equal to a plurality of control cycles nΔt. This predetermined time will be referred to as a loose engagement cycle hereinafter.

In this loose engagement control, a loose engagement duty value is determined for each loose engagement cycle on the basis of the rotational difference between the input and output sides of the clutch. A value Ne of the rotational frequency of the engine which is detected by the engine rotation sensor 18 is used as the clutch input side rotational frequency. This is because when the vehicle is in motion, lockup clutch engagement is performed and thus the clutch input side rotational frequency can be considered equal to the engine rotational frequency. A value Ni of the rotational frequency of the input shaft, which is calculated from the output of the transmission rotation sensor 20 and the gear ratio as described above, is used as the clutch output side rotational frequency.

In this case an upshift is performed, and therefore the engine rotational frequency Ne is higher than the input shaft rotational frequency Ni, as shown in FIG. 5(d). Accordingly, the rotational difference ΔN is calculated by subtracting the input shaft rotational frequency Ni from the engine rotational frequency Ne (ΔN=Ne−Ni).

As shown in FIG. 8, a step duty Ds value is set in a map format in respect of the rotational difference ΔN for each gear stage of the transmission. This step duty calculation map is stored in advance in the ECU 16.

The specific content of clutch loose engagement control is as follows. First, in the loose engagement cycle at a time t3, a loose engagement duty Dk3 is outputted as an initial value. The value of this loose engagement duty Dk3 is slightly further toward the engagement side than the torque point learned value. Then, the rotational difference ΔN3 at this time is calculated and the step duty Ds3 is determined from the current gear stage and the value of ΔN3 in accordance with the map in FIG. 8. Then, in the next loose engagement cycle at a time t4, which is the next control cycle, a value, which is obtained by subtracting the step duty Ds3, from the previous loose engagement duty Dk3 is set as a loose engagement duty Dk4 for this cycle, and this value is outputted from the ECU 16. Likewise, the rotational difference ΔNn is calculated in the loose engagement cycles at times tn (n=4, 5, 6 . . . ), the step duty Dsn is determined in accordance with the map in FIG. 8, the step duty Dsn is subtracted from the previous loose engagement duty Dkn in the next loose engagement cycle at a time tn+1, which is the next control cycle, the value thereof is set as the current loose engagement duty Dkn+1, and this value is outputted from the ECU 16. By repeating this control in such a manner, the clutch is gradually engaged and the rotational difference ΔN gradually becomes smaller.

Note that the calculation cycle for the step duty Ds and the control cycle Δt do not necessarily have to be equal. In such a case, the loose engagement duty Dk is updated every time the step duty Ds is calculated, and this updated cycle becomes the loose engagement cycle.

Thus when a predetermined loose engagement completion condition is satisfied, loose engagement control ends and processing moves to rapid clutch engagement control. The loose engagement completion condition in this embodiment is that the rotational difference ΔN be a small value of 150 rpm or less, or that the duty outputted from the ECU 16 reach a loose engagement end duty De at which the clutch can be considered sufficiently engaged. In rapid clutch engagement control, a rapid engagement duty equaling 0% is outputted at a predetermined time of 0.3 sec. Full clutch engagement control is then performed, whereupon clutch engagement control ends. Likewise in fill clutch engagement control, a full engagement duty equaling 0% is outputted at a predetermined time of 1 sec.

Next, a process performed during a downshift will be described using FIGS. 6 and 9. An upshift and a downshift are largely similar. The difference therebetween is that during a downshift, the input shaft rotational frequency Ni is higher than the engine rotational frequency Ne, as shown in FIG. 6(*d*), and thus calculation of the rotational difference ΔN is reversed, the rotational difference ΔN being calculated by subtracting the engine rotational frequency Ne from the input shaft rotational frequency Ni (ΔN=Ni−Ne). Also, the step duty Ds values are set separately from those in the case of an upshift, and more specifically a step duty calculation map for a downshift such as that shown in FIG. 9 is prepared separately. The values in the map are appropriate for a downshift. The remaining content of the clutch engagement control is similar to that described above, and one-shot engagement control is also similar in that a starting duty Dst=0(%) is outputted during a waiting time Δtst of 0.1 sec.

Next, a process performed during a garage shift will be described using FIGS. 7 and 10. In FIG. 7, times before the time t1 indicate a stationary state prior to advance in which the gear is in neutral, a braking operation is being performed, the engine is idling, the gear shift clutch 3 is engaged, the lockup clutch 7 is disengaged, and the output of the engine is transmitted to the countershaft 10 and main gears M1 . . . of the transmission T/M via the fluid coupling 2 and the gear shift clutch 3. This is in order to agitate mission oil which is accumulated inside the transmission T/M through the rotation of the counter gears 12 to cause an increase in temperature. At this time, the engine rotational frequency Ne, turbine rotational frequency Nt, and input shaft rotational frequency Ni are all equal.

When a gear shift operation is performed by the driver from this state, first the knob switch is turned ON to fully disengage the clutch (t1), as a result of which the input shaft rotational frequency Ni drops. Then, when the gear is engaged in the advance stage, clutch engagement begins (t2). At the same time as the vehicle is put into gear, the input shaft 8 is stopped from the driving wheel side by the brake, and hence the rotational frequency thereof is zero.

The initial one-shot engagement control is as described above. That is, the starting duty Dst=0% is outputted at a fixed waiting time Δtst=0.1 sec. Next, processing moves to similar loose engagement control to that described above. In the loose engagement control, a step duty Ds is read from a garage shift map shown in FIG. 10. In this loose engagement control the turbine 5 is gradually damped from the driving wheel side as the clutch is engaged, and hence the turbine rotational frequency Nt gradually drops.

Then, when the rotational difference ΔNet (=Ne−Nt) between the engine rotational frequency Ne and turbine rotational frequency Nt reaches or exceeds a predetermined value Nm (300 rpm in this embodiment), the clutch is considered to be substantially engaged and loose engagement control ends. Similar rapid clutch engagement control and full clutch engagement control to those described above are then performed, whereupon engagement control ends.

A gear stage detection device according to this embodiment which is applied to this type of vehicle power transmission device will now be described.

In the power transmission device described above, clutch engagement begins when the vehicle is put into gear, upshifts and downshifts are distinguished between, and so on, and thus the gear stage and gear position of the transmission are detected at all times. As a rule, this detection is performed by the aforementioned gear position sensor 24 (see FIG. 4).

Figure 16:
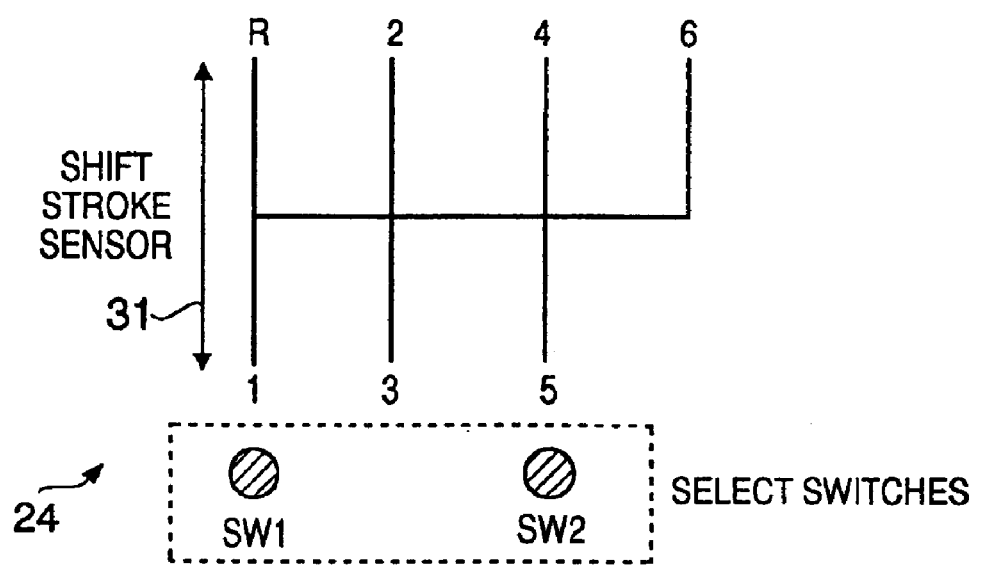
FIG. 16 is a view showing the constitution of a gear position sensor according to this embodiment.

FIG. 16 shows the gear position sensor 24 in detail. R, 1, 2 . . . indicate reverse, first speed, second speed . . . , and the shift lever moves in an H pattern as shown in the drawing. The gear position sensor 24 is constituted by a shift stroke sensor 31 which detects a stroke in a shift direction performed by a member which is coupled to the shift lever, and two select switches SW1, SW2 which detect the position of the select direction of this member. One of the select switches SW1 is provided in a select position corresponding to reverse and first speed and switches ON in this position. The other select switch SW2 is provided in a select position corresponding to fourth speed and fifth speed and switches ON in this position. The select switch SW2 also switches ON in a select position corresponding to sixth speed. For example, if the shift stroke sensor 31 indicates a position on the front row of the shift direction (a position corresponding to reverse, second speed, fourth speed, or sixth speed), and if the select switch SW1 and select switch SW2 are OFF, it can be determined that the current gear stage is second speed. Note that since fourth speed and sixth speed cannot be distinguished by the select switch SW2, they are determined using the gear stage detection device to be described hereinafter. Note also that the gear position sensor 24 may be provided in various embodiments other than that described above.

When a breakdown such as a short circuit or disconnection occurs in the gear position sensor 24, the current gear position cannot be determined, causing clutch control and the like to fail.

Hence a device which detects or estimates the gear stage of the transmission indirectly without recourse to the gear position sensor 24 is provided as backup in this embodiment. This device will now be described in detail.

This gear stage detection device uses rotary pulses generated respectively by the vehicle speed sensor 21 and transmission rotation sensor 22 while the transmission rotates to determine the current gear stage. The constitution thereof is illustrated in FIG. 11, and identical elements to those described hereinabove have been allocated identical reference symbols.

As shown in the drawing, this device is mainly constituted by the aforementioned transmission T/M, vehicle speed sensor 21, transmission rotation sensor 20, and ECU 16 which serves as gear stage determining means. A rotary shaft 31 of the vehicle speed sensor 21 is rotationally driven by an output shaft 9 via a meter gear 32. The meter gear 32 is omitted from FIG. 1, but, as shown in detail in FIG. 11, is constituted by a meter drive gear 33 which is fixed to the output shaft 9 and a meter driven gear 34 which is meshed therewith and fixed to the rotary shaft 31. The vehicle speed sensor 21 generates a pulse signal at each equal phase interval of the rotary shaft 31, and generates a predetermined number of pulse signals (in this embodiment 25) per revolution of the rotary shaft 31. These pulse signals are inputted directly into the ECU 16. Since the rotary shaft 31 is coupled to the output shaft 9, the vehicle speed sensor 21 constitutes output shaft side pulse generating means for generating pulse signals in a number which corresponds to a rotary phase of the output shaft 9.

Meanwhile, the transmission rotation sensor 22 generates a pulse signal every time the teeth of the input counter gear 12 which opposes the transmission rotation sensor 22 pass thereby, and this pulse signal is inputted directly into the ECU 16. Since the input counter gear 12 is coupled to the input shaft 8, the transmission rotation sensor 22 constitutes input shaft side pulse generating means for generating pulse signals in a number which corresponds to a rotary phase of the input shaft 8.

Figure 11:
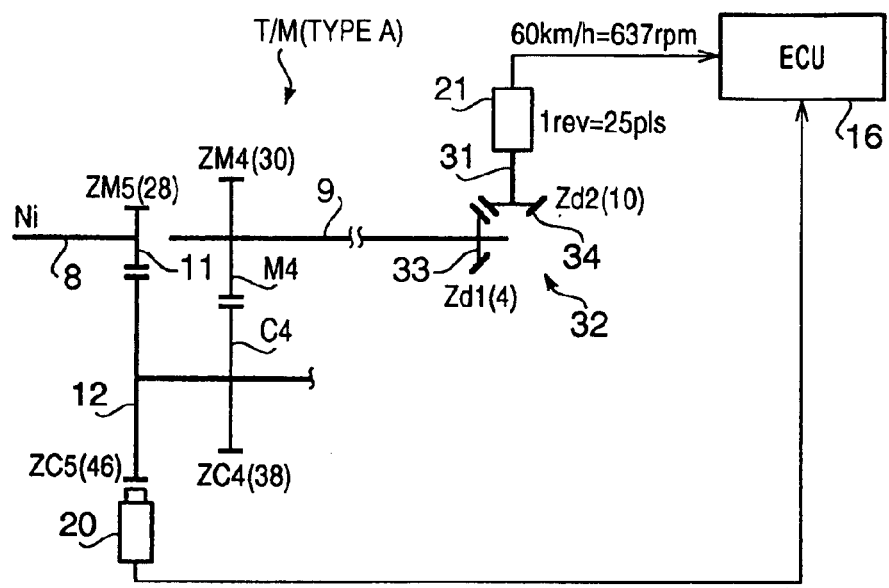
FIG. 11 is a block diagram showing an embodiment of a gear stage detection device.

In FIG. 11, the gear ratio of the meter gear 32 is predetermined such that when the vehicle speed is 60 km/h, a vehicle speed pulse corresponding to rotation at 637 rpm is inputted from the vehicle speed sensor 21 into the ECU 16. More specifically, resetting of the meter driven gear 34 in accordance with the radius of movement of the tires and various other variations is performed at the time of factory shipping or the like.

Figure 12:
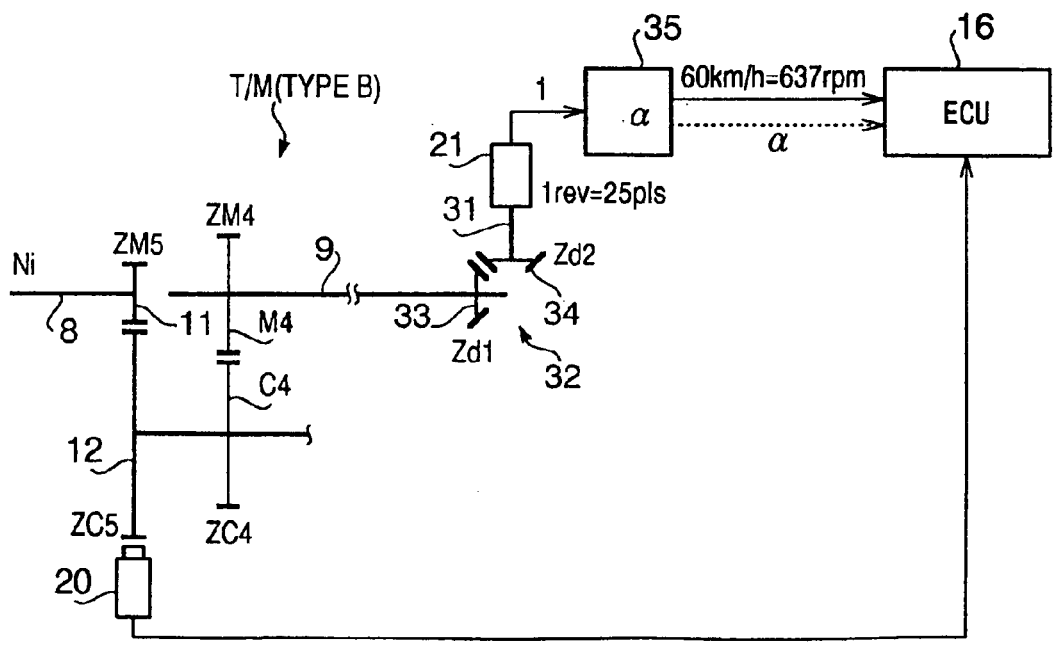
FIG. 12 is a block diagram showing another embodiment of a gear stage detection device.

The case described above pertains to a type A in which pulses from the vehicle speed sensor 21 are inputted directly into the ECU 16, but in the case of a type B, as shown in FIG. 12, a pulse matching unit 35 is connected downstream of the vehicle speed sensor 21 in order to correct the vehicle speed signal according to the tire radius of movement, final gear ratio, and so on, whereupon a pulse corresponding to 60 km/h=637 rpm and a correction coefficient $\alpha$ thereof are both inputted into the ECU 16. In this case, the gear ratio of the meter gear is fixed, and the pulse matching unit 35 is adjusted appropriately and $\alpha$ is determined at the time of factory shipping or the like.

Figure 15:
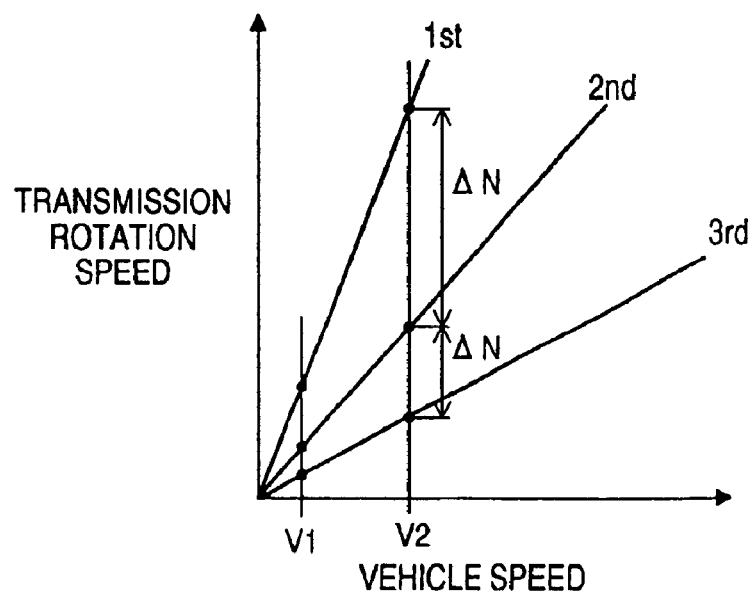
FIG. 15 is a graph showing a typical relationship between vehicle speed and transmission rotation speed

As shown in FIG. 15, when the transmission is in any of the gear stages, the relationship between vehicle speed and transmission rotation speed (that is, input shaft rotation speed) logically becomes a proportional relationship which is determined in accordance with the gear ratio of each gear stage. Note that in the graph, only first speed ($1^{st}$), second speed ($2^{nd}$), and third speed ($3^{rd}$) are shown as examples. Hence if the transmission rotation speed at a certain vehicle speed is known, the current gear stage can be determined. The conventional technology disclosed in Japanese Patent Application Laid-Open Publication No. H4-171353 makes use of this principle.

In actuality, however, although there is no problem at a comparatively high vehicle speed V2 since the difference $\Delta N$ in transmission rotation speed between each gear stage is large, at a comparatively low vehicle speed V1 this difference $\Delta N$ is small, and therefore the margin of error between the actual value and the calculated value increases, leading to the possibility of misjudging the gear stage.

More specifically, processing is executed inside the ECU to count the number of pulses generated by the vehicle speed sensor and transmission rotation sensor (respectively known as a vehicle speed pulse and a transmission pulse) during a predetermined time period, whereupon this counted pulse number is divided by the predetermined time period to calculate the vehicle speed and transmission rotation speed. At low vehicle speeds, however, the pulse generation interval is long and there is therefore no guarantee that a sufficient number of pulses will be generated during the predetermined time period. Hence the calculated value obtained by dividing this number by the time element cannot necessarily be considered an accurate value, and thus there is a large possibility that a misjudgment will occur when the gear stage is determined on the basis of such a calculated value. When the effects of noise and the like are taken into consideration, the possibility of a misjudgment caused by the calculated value deviating from an accurate value grows even larger.

Hence in this embodiment, the gear stage is determined using the pulse outputted from the sensors itself rather than using such a calculated value divided by a time element.

The principle of this embodiment is as follows. If the transmission is in any one of the gear stages, the input shaft performs a certain phase rotation while the output shaft performs a certain phase rotation. The degree of phase rotation performed by the input shaft in respect of a fixed output shaft rotary phase is determined in accordance with the gear ratio of the gear stage in which the transmission is engaged.

Hence, by detecting the number of input shaft side rotary pulses generated during the generation of a certain unitary number of output shaft side rotary pulses, the current gear stage may be specified. To explain this with a straightforward example, it is assumed that during the generation of ten pulses by the vehicle speed sensor 21, the transmission rotation sensor 22 generates fifty pulses in first speed, forty pulses in second speed, and thirty pulses in third speed. These values of fifty pulses in first speed, forty pulses in second speed, and thirty pulses in third speed are stored in advance in the ECU 16, and when the transmission actually rotates while the vehicle is in motion, the number of pulses generated by the transmission rotation sensor 22 during the generation of ten pulses by the vehicle speed sensor 21 is counted. If this counted pulse number is fifty, first speed is indicated, if the number is forty, second speed is indicated, and if the number is thirty, third speed is indicated, and thus the current gear stage can be determined. The present device works on such a principle.

Note that this example uses the output shaft side as a standard, but the input shaft side may also be used as a standard.

The embodiment shown in FIG. 11 follows this principle. In the drawing, the symbols beginning with Z indicate the number of teeth of each gear. The vehicle speed sensor 21 generates twenty-five vehicle speed pulses (25 pls) per one revolution (1 rev) of the rotary shaft 31.

An example in which the transmission is in fourth speed will be described. The input shaft rotational frequency Ni per revolution of the rotary shaft 31 of the vehicle speed sensor 21 is determined according to the following equation (1).

[Numeral 1] $1 \times Zd2/Zd1 \times ZM4/ZC4 \times ZC5/ZM5 = Ni(rev)$ (1)

Note that the gear ratio GR(m) of the meter gear 32 is set according to the following equation.

[Numeral 2] $GR(m) = Zd2/Zd1$

The gear ratio of fourth speed, or in other words the reduction gear ratio GR(4) is set according to the following equation.

[Numeral 3] $GR(4) = ZM4/ZC4 \times ZC5/ZM5$

By multiplying the number of teeth ZM5 of the input main gear 11 by both sides of equation (1), a number of transmission pulses PTM generated by the transmission rotation sensor 20 during one revolution of the rotary shaft 31 of the vehicle speed sensor 21, or in other words during the generation of twenty-five pulses by the vehicle speed sensor 21, can be calculated (since the number of teeth passed through of the input main gear 11=the number of teeth passed through of the input counter gear 12). In other words, the following equation (2) is established.

[Numeral 4] $1 \times Zd2/Zd1 \times ZM4/ZC4 \times ZC5/ZM5 \times ZM5 = PTM(pls)$ (2)

Basically, the gear stage can be determined in accordance with equation (2). That is, the gear ratios GR(1), GR(2), GR(3), . . . of each gear stage, the gear ratio GR(m) of the meter gear 32, the number of teeth ZM5 of the input main gear 11, the counted value of the number of transmission pulses PTM generated by the transmission rotation sensor 20 during the generation of twenty-five pulses by the vehicle speed sensor 21, the aforementioned gear ratio GR(m) of the meter gear, and the number of teeth ZM5 of the input main gear 11 in equation (2) are inserted into equation (2), and then the gear ratios GR(1), GR(2), GR(3), . . . of each gear stage are successively inserted into equation (2). Thus the gear stage at which equation (2) is substantially established is determined to be the current gear stage.

In order to simplify the processing which is performed within the ECU 16 in this embodiment, however, the following processing is performed. By dividing both sides of equation (2) by the gear ratio GR(4), the following equation is established.

[Numeral 5] $1 \times Zd2/Zd1 \times ZM5 = Nd(\text{fixed}) = PTM/GR(4)$ (3)

That is, the value obtained by dividing the transmission pulse number PTM by the gear ratio is set as a fixed value Nd regardless of the gear stage. Only this fixed value Nd and the gear ratios GR(1), GR(2), GR(3), . . . of each gear stage are pre-stored in the ECU 16. Then, when the gear stage is to be detected, the number of transmission pulses PTM generated by the transmission rotation sensor 20 during the generation of twenty-five pulses from the vehicle speed sensor 21 is counted in ECU 16, this counted transmission pulse number PTM and the fixed value Nd are inserted into equation (3), the gear ratios GR(1), GR(2), GR(3), . . . of each gear stage are then successively inserted into equation (3), and the gear stage at which equation (3) is substantially established is determined to be the current gear stage. This is a second method.

Note that even when the transmission pulse number PTM serving as an actual measured value is divided by the gear ratio of the current gear stage, the resultant value may not accurately match the theoretical fixed value Nd. Hence it is assumed that when the value obtained by this division substantially matches the fixed value Nd, for example when the value is within several percent of the fixed value Nd, equation (3) is established. This is the meaning of "substantially established".

As another method based on equation (3), a gear ratio may be calculated by dividing the counted transmission pulse number PTM by the fixed value Nd, whereby the gear stage which corresponds to this gear ratio is determined as the current gear stage. As noted above, in this calculation also the value obtained by the division process may not accurately match the gear ratio of the current gear stage, and thus when the value substantially matches the gear ratio, for example when the value is within several percent of the gear ratio, the gear stage which corresponds to the gear ratio may be determined as the current gear stage. This is a third method.

Here, the second method will be described using specific values. As shown in FIG. 11, the number of teeth Zd1 of the meter drive gear 33 is four, the number of teeth Zd2 of the meter driven gear 34 is ten, and the number of teeth ZM5 of the input main gear 11 is twenty-eight, for example. The left side of equation (3) at this time is 10/4×28=70. This value of 70 is set as the fixed value Nd and stored in the ECU 16.

The gear ratios GR of each gear stage, as shown in FIG. 13a, are also stored in the ECU 16. Note that for convenience, a five-speed transmission is used here as an example. The transmission shown in FIG. 1 is a basic five-speed transmission with a sixth speed part (constituted by the sixth speed main gear M6 and the like) added as an extra gear, but when this sixth speed part is omitted, a five-speed transmission is obtained.

FIG. 13b shows numbers of transmission pulses PTM presumed to be generated during the generation of twenty-five vehicle speed pulses when the transmission is actually in the various gear stages. Accordingly, it is assumed here that 203 actual transmission pulses are generated during the generation of twenty-five vehicle speed pulses, and that this pulse number is counted by the ECU 16. The ECU 16 then successively calculates values of 203 divided by the gear ratios GR(R)=5.068, GR(1)=5.315, GR(2)=2.908 . . . of each gear stage and extracts the value which is closest to the previous fixed value Nd=70. Here, at second speed 203/2.908=69.8, which is closest to 70 (that is, within several percent of 70), and thus the current gear stage is determined to be second speed.

(Nd) in FIG. 13a indicates the values obtained by dividing the transmission pulse number PTM in each gear stage by the gear ratio GR of each gear stage and discarding the figures after the decimal point. In the case of second speed as described above, by discarding the figure after the decimal point of 69.8, an (Nd) value of 69.0 is obtained.

Note that according to the third method, the gear ratio which is closest to a value of 2.9, which is obtained by dividing the actual transmission pulse number PTM=203 by the fixed value Nd=70, is extracted, and since GR(2)=2.908 is closest thereto, the current gear stage is determined to be second speed.

Next, a case in which the transmission T/M is of the type B shown in FIG. 12 will be described.

Apart from the fact that the pulse matching unit 35 is connected to the downstream side of the vehicle speed sensor 21 and the pulse of the vehicle speed sensor 21 is inputted into the ECU 16 following correction by the correction coefficient α, this type B is basically the same as the type A of FIG. 11. As concerns the relationship between the transmission rotation sensor 20 and vehicle speed sensor 21, however, the pulse numbers inputted into the ECU 16 differ according to the correction coefficient α.

In a vehicle having a comparatively large amount of variation in its tire movement radius, final gear ratio, and so on, the amount of resetting of the meter driven gear 34 during factory shipping increases, making this resetting difficult. Hence the pulse matching unit 35 is adjusted so as to reduce or eliminate such resetting, whereby the time interval of the vehicle speed pulse is adjusted and a vehicle speed pulse corresponding to 637 rpm at a vehicle speed of 60 km/h is inputted into the ECU 16.

The correction coefficient α is usually variable within a range of 0.8 to 1.2, but following adjustment of the pulse matching unit 35 becomes a fixed value. For every one input into the pulse matching unit 35, the corresponding output is α, and thus when the input is twenty-five pulses, the corresponding output is 25αpulses. The value of α following setting is transmitted to and stored in the ECU 16.

In this case, equation (2) may be modified as follows.

[Numeral 6] $1/\alpha \times Zd2/Zd1 \times ZM4/ZC4 \times ZC5/ZM5 \times ZM5 = PTM(\text{固定})$ Accordingly, the value obtained by dividing the two sides of the equation by the gear ratio GR(4) also becomes a fixed value, and if this fixed value is assumed to be Nd, equation (3) is altered as follows.

[Numeral 7] $1/\alpha 1 \times Zd2/Zd1 \times ZM5 = Nd(\text{fixed}) = PTM/GR(4)$ \hfill (3)'

Hence, as described above, the gear stage can be determined by the first method using equation (2)', or the gear stage can be determined by the second or third method using equation (3)'.

Figure 14:
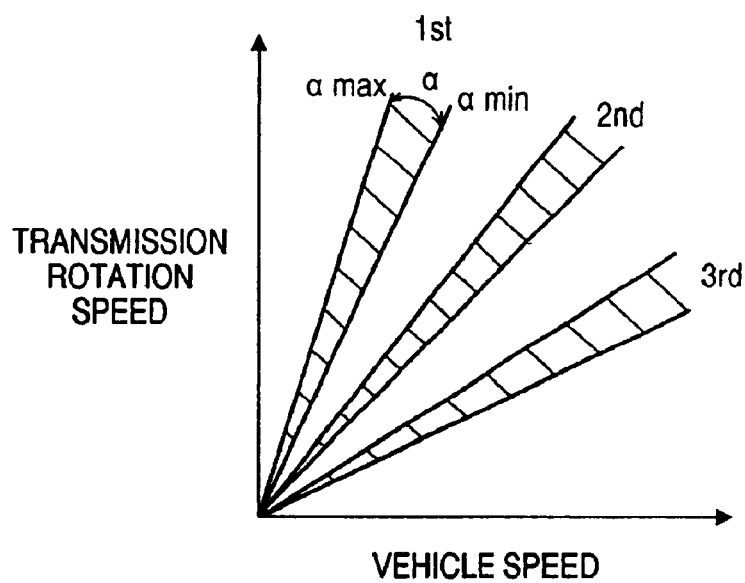
FIG. 14 is a graph showing a relationship between vehicle speed and transmission rotation speed, taking into account a correction coefficient range.

FIG. 14 shows the relationship between vehicle speed and transmission rotation speed in this case. In accordance with the feasible range of the correction coefficient α (from αmin=0.8 to αmax=1.2), a certain range, shown by shading in the drawing, is also produced in the proportionate straight lines at each gear stage. If the ranges of the gear stages do not overlap, as in the drawing, the gear stage within whose range the calculated value falls may be specified as the current gear stage.

That is, according to equation (3)', when the correction coefficient α is at its minimum value αmin, Nd reaches its maximum value Ndmax, and when the correction coefficient α is at its maximum value αmax, Nd reaches its minimum value Ndmin. A value PTM/GR, obtained by dividing the actually counted transmission pulse number PTM by the gear ratio GR, is then calculated for each gear stage, and the gear stage which satisfies Ndmin≦PTM/GR≦Ndmax may be determined as the current gear stage.

Thus according to the present invention, the current gear stage is determined using the number of pulses outputted from the sensors itself (a so-called pulse generation value) rather than using a value obtained by dividing the output of the sensors by a time element and speed-converting the resultant value. As a result, accurate gear stage detection can be performed even at low vehicle speeds, the detection precision can be increased, and misjudgments of the gear stage can be forestalled.

In particular, the gear stage detection device is provided in this embodiment, and therefore the gear stage can be detected even when the gear position sensor 24 suffers a breakdown or the like such that clutch control (particularly clutch control at low vehicle speeds) can be performed without hindrance. Further in cases where a judgment can not be made as to whether the transmission is in fourth or sixth speed using the single select switch SW2, as shown in FIG. 16, the gear stage detection device is used in combination with the select switch SW2 or alone to determine whether the transmission is in fourth or sixth speed. Moreover, the number of sensors and switches can be actively reduced or completely omitted, enabling further reductions in cost.

Note that at low speeds a certain amount of time is required for a fixed number of pulses to accumulate, and therefore gear stage detection may take longer than is conventional. However, gear stage detection can be performed far more accurately than in the past, and the merits thereof are substantial. At high speeds, meanwhile, pulses accumulate momentarily, and therefore gear stage detection can be performed rapidly.

As can be understood from the above description, the ECU 16 in this embodiment constitutes the gear stage determining means.

A method of detecting a gear stage was described above, but in the type A transmission the gear ratio of the meter gear 32 varies, or more specifically the meter driven gear 34 is reset during factory shipping or the like. In the gear stage detection method described above, the gear stage cannot be detected unless the number of teeth Zd2 of the driven gear 34 is known, and hence the number of teeth of the driven gear, and accordingly the meter gear ratio, must be learned at the time of factory shipping or the like. When gear stage detection is to be performed in this embodiment, the gear ratios for each transmission type and the signal output of the vehicle speed sensor 21 and transmission rotation sensor 20 at the speedometer gear ratio of each transmission type are converted into a map and stored in the ECU 16 in advance, data which match the transmission type and speedometer gear ratio in the map are learned and determined from the signal output of the vehicle speed sensor 21 and transmission rotation sensor 20 during factory shipping or the like, and gear stage detection is performed on the basis of the data determined from the map.

This will be described below

FIG. 17 shows PTM pulse numbers (values inputted into the ECU 16) and values of Nd for the reduction gear ratios of the gear stage Rev and the first through sixth gear stages, and for the meter gear ratio (in this example, the number of teeth Zd1 of the meter drive gear 33 is fixed at four, and therefore the number of teeth of the driven gear is shown in a range from 10 to 17).

In the map in FIG. 17, the value of Nd is stored according to equation (3), and thus, according to equation (3), when the number of teeth of the meter driven gear 34 is ten, Nd=10/4×28=70, when eleven, Nd=11/4×28=77, and when twelve, Nd=12/4×28=84. The PTM numbers stored in the ECU 16 may be calculated using equation (2).

Then, upon factory shipping, the vehicle is subjected to a trial run, and if the current gear stage is fourth speed, for example, the value of Nd is determined by dividing the counted value (PTM) of the transmission rotation sensor 20 by the reduction gear ratio (1.297) of fourth speed.

When this Nd value is 70, the map in FIG. 17 is referenced to determine that the value of Nd is 70 when the number of teeth of the driven gear is ten, and thus it is learned that the number of teeth of the driven gear is ten. If the PTM value for fourth speed in the ECU 16 matches the actual number of pulses generated by the transmission rotation sensor 20, then it can be confirmed that the transmission rotation sensor 20 and the like are in normal working order and that ten is the correct number of teeth for the driven gear. Thereafter, the gear stage is estimated using the selected map.

If the Nd value is 77, then it is learned that the number of teeth of the driven gear is eleven, and in this case the map for eleven driven gear teeth is referenced to determine the gear stage.

By similarly determining the Nd value, judging the number of teeth of the driven gear, and referencing the map which corresponds to the number of teeth of the driven gear on the basis of this determination, the gear stage can be determined easily for various meter gear ratios (numbers of driven gear teeth).

In the map in FIG. 17, the reduction gear ratio in fifth speed is 1.000, but when the gear ratio of the transmission T/M is 1.000 in fourth speed, the map shown in FIG. 18 may be used, whereby maps corresponding to each gear ratio of the transmission T/M are stored in the ECU 16, a map which matches the type of transmission T/M is selected therefrom, and the map which may be used to determine the driven gear ratio is determined thereafter The data indicated in the map in FIG. 17 (and likewise in FIG. 18) by "FAIL" are data used for accurately judging a breakdown of the gear position sensor 24.

When the switch SW1 of the gear position sensor 24 shown in FIG. 16 breaks down due to a disconnection, detection of Rev and $1^{st}$, which are detected by the switch SW1, becomes impossible and only the data of the shift stroke sensor 31 remain such that the calculated value of the transmission rotation sensor pulse number and the detected actual number of pulses generated by the transmission rotation sensor 20 differ.

In this case, the pulse value (input value) of the transmission rotation sensor at the gear stage obtained through gear position determination by the gear position sensor 24 becomes a PTM value corresponding to $2^{nd}$ in Rev, $4^{th}$, and $6^{th}$ and corresponding to $3^{rd}$ in $1^{st}$ and $5^{th}$. Thus the Nd values determined from the actual inputted transmission rotation sensor pulse differ therefrom, and by inputting these differing Nd values into the map in advance, a breakdown in the switches SW1, SW2 can be judged accurately and a diagnosis can be made as to which of the switches SW1, SW2 has broken down.

Next, a case in which the transmission is of the type B shown in FIG. 12 will be described.

In this case, a value of the correction coefficient α is inputted into the ECU 16 in advance, and thus upon determination of the driven gear ratio, the meter gear ratio may be determined from a value obtained by multiplying α by the value of Nd according to equation (3)', and a map which corresponds to the number of teeth of the driven gear based on the determined meter gear ratio may be selected.

As for gear stage detection, the gear position may be determined from a value obtained by multiplying a by the transmission pulse number PTM and the selected map.

Figure 19:
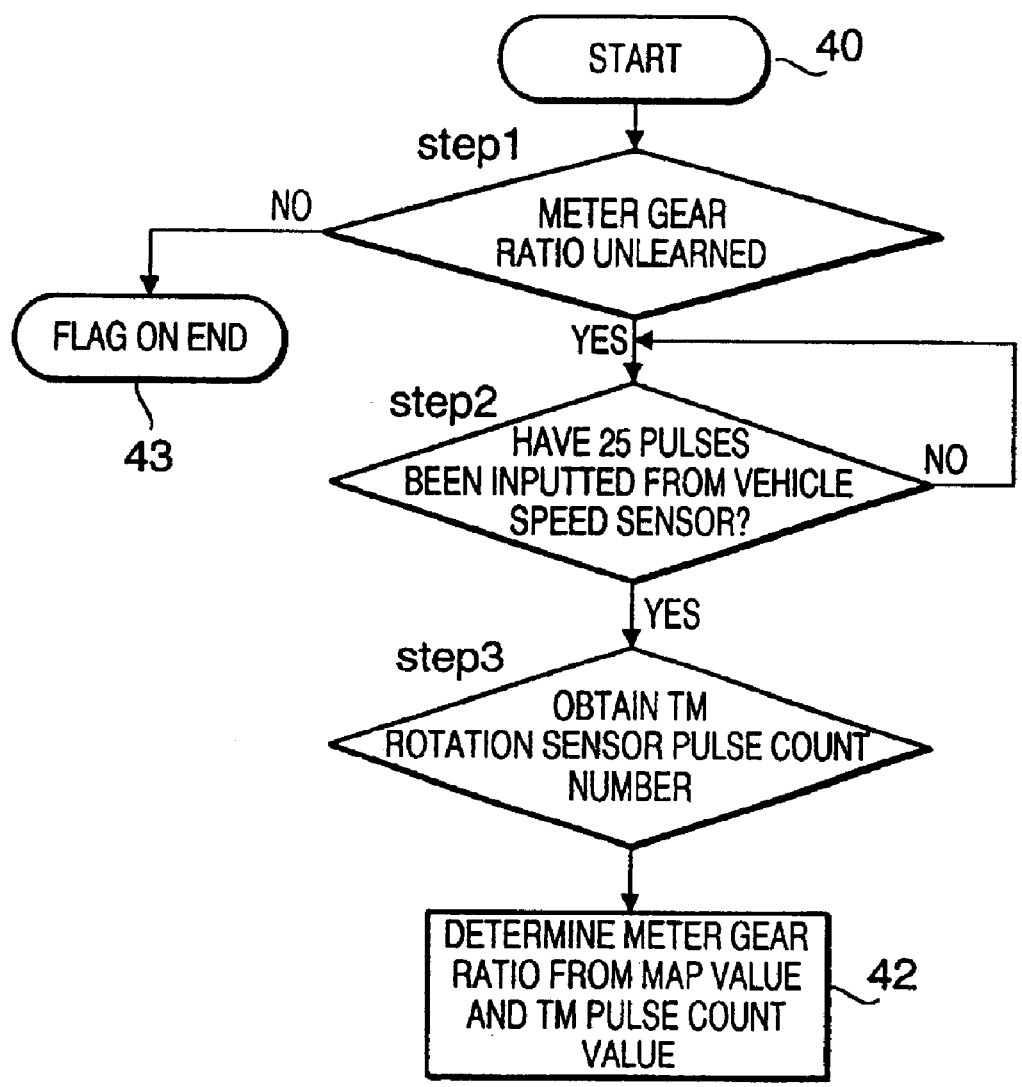
FIG. 19 is a view showing a flowchart for learning a meter gear ratio in this embodiment.
Figure 20:
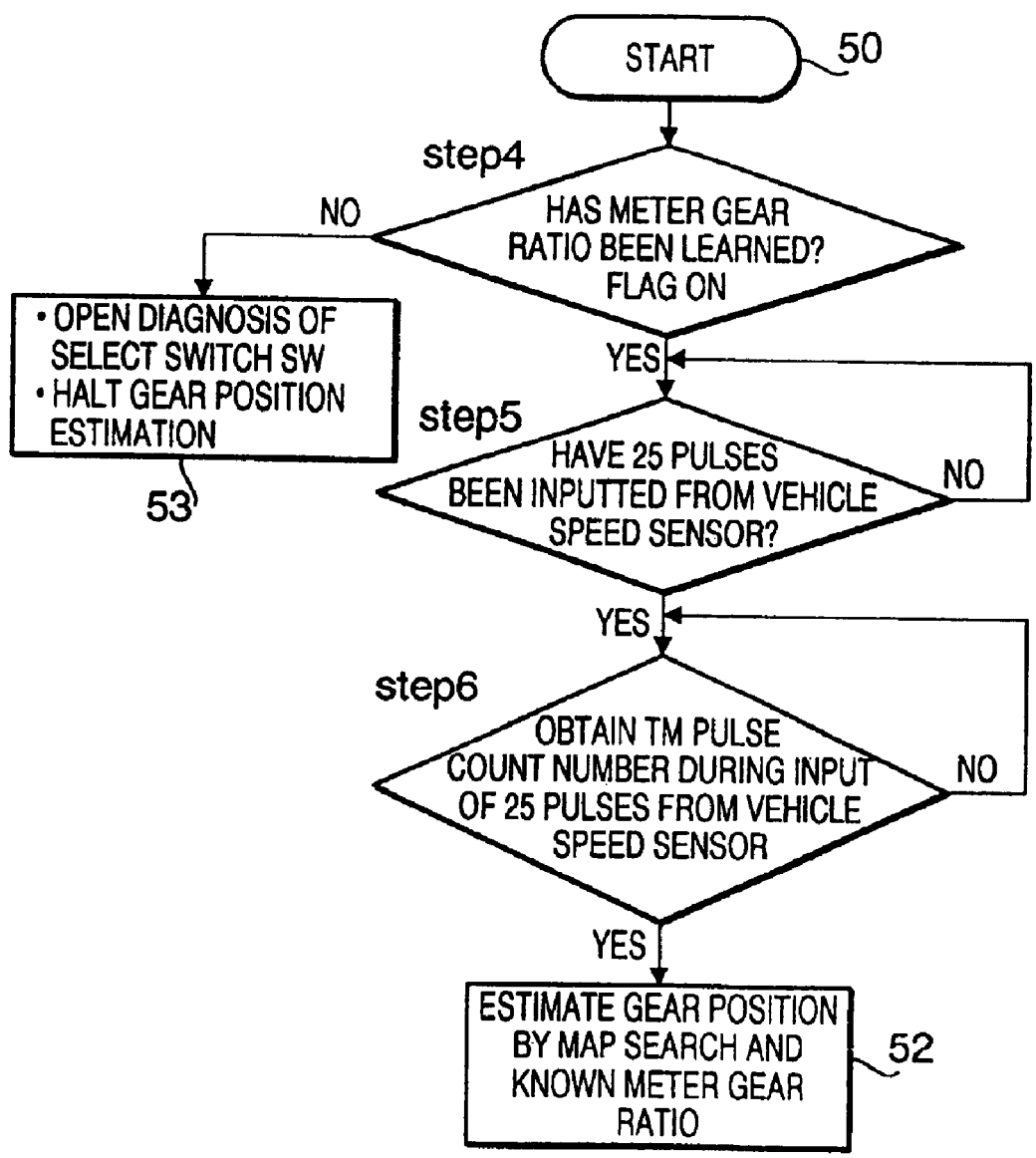
FIG. 20 is a view showing a flowchart for determining a gear stage in this embodiment.

FIGS. 19 and 20 show flowcharts used for estimating the gear position by learning the meter gear ratio as described above and on the basis of the learned meter gear ratio.

First, to describe the flow of meter gear ratio (in this embodiment, the number of teeth of the driven gear) determination in FIG. 19, control is started 40, and in a step 1 a determination is made as to whether the meter gear ratio is as yet unlearned or not. If the meter gear ratio is unlearned (yes), a determination is made in a step 2 as to whether or not twenty-five have been inputted from vehicle speed sensor, and if twenty-five pulses have been counted (yes), a determination is made in a step 3 as to whether or not a pulse count number has been obtained from the transmission rotation sensor. If this number has been obtained (yes), the meter gear ratio is determined from the map values shown in FIGS. 17, 18 and a T/M pulse count value from the transmission rotation sensor, or in other words a determination 42 of the number of driven gear teeth is performed.

If, in the determination of step 1, the meter gear ratio is not unlearned, or in other words if learning is complete (no), control is halted 43. At this time, if either of the maps in FIGS. 17, 18 based on the number of driven gear teeth is obtained as learned in order to diagnose a breakdown of the select switches SW1, SW2, a flag indicating "learned" is raised in the ECU 16.

Next, the flow of gear stage determination will be described according to FIG. 20.

Control is started 50, and then, in a step 4, a determination is made as to whether the meter gear ratio has been learned. If a flag is raised as noted above, it is determined that the ratio has been learned (yes), and then, in a step 5, a determination is made as to whether twenty-five pulses have been inputted from the vehicle speed sensor. If twenty-five pulses have been counted (yes), a determination is made in a step 6 as to whether the pulse count number of the transmission rotation sensor has been obtained. If the number has been obtained (yes), the gear position is determined from the map which is selected from FIGS. 17 and 18 by means of a map search and the known meter gear ratio.

The flow of FIG. 20 is performed constantly while the vehicle is in motion, and thus gear stage determination may be performed even when the position sensor 24 has broken down.

If, in step 4, the meter gear ratio is unlearned (no), or in other words if the flag is not raised, open diagnosis of the select switches and gear position estimation are cancelled 53.

Thus by storing a map in the ECU 16 in advance, obtaining the number of pulses of the transmission T/M rotation sensor 20 generated during the input of twenty-five pulses from the vehicle speed sensor 21, and selecting a map which corresponds to the transmission type, the gear stage can be determined.

The gear stage estimation described above, which is performed by learning the meter gear ratio, is an example of a case in which a plurality of meter gear ratios exist for the gear ratio of each gear stage (Rev, $1^{st}$ through $5^{th}$, or $1^{st}$ through $6^{th}$). There are, however, a plurality of variations in the transmission itself, and in some cases only the gear ratios of predetermined gear stages differ from one another. For example, in transmissions where the gear ratios of $3^{rd}$ and $6^{th}$ differ but the gear ratios of the other gear stages match, a map cannot be learned according to the flows illustrated in FIGS. 19 and 20.

Figures 21, 22:
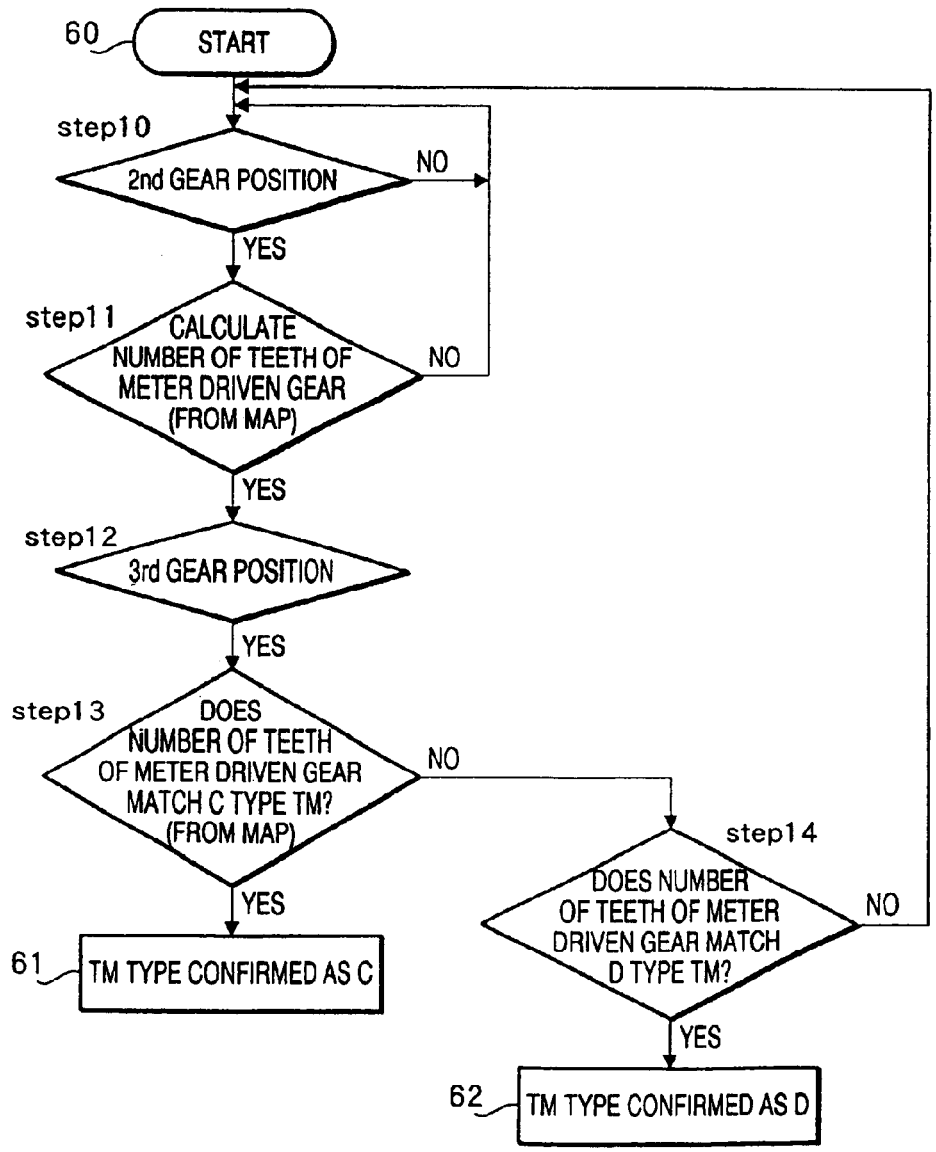
FIG. 21 is a view showing an example of a relationship between a gear shift stage and a number of teeth in transmissions having differing specific gear stages.
FIG. 22 is a view showing a flowchart for determining the type of transmission in FIG. 10.

FIG. 21 shows numbers of teeth for the main gears and counter gears of $1^{st}$ through $6^{th}$ and Rev in two types of transmission, namely a C type and a D type. Although the number of teeth of the main gear and counter gear of Dri ($5^{th}$ reduction gear ratio 1), $4^{th}$, $2^{nd}$, $1^{st}$ and Rev match, the numbers in $3^{rd}$ and $6^{th}$ differ, and hence when the transmission is in the second gear position, type C and type D cannot be distinguished even when the number of teeth of the meter driven gear is calculated.

In this case, two types of maps such as that shown in FIG. 17 but corresponding individually to type C and type D are stored in the ECU 16, the pulse number of the transmission rotation sensor in the $3^{rd}$ gear position having differing gear ratios is determined, one of type C or type D is determined, and a corresponding map is selected.

A flowchart of this determination will be described using FIG. 22.

Control is begun 60, and then, if it is determined in a step 10 that the transmission is in a gear stage having common gear ratios in type C and type D, for example the second gear position (yes), a determination is made in a step 11 as to whether or not the number of teeth of the meter driven gear has been calculated from a map. If the number of teeth has been calculated (yes), a determination is made in a step 12 as to whether or not the transmission is in a gear stage having differing gear ratios, for example $3^{rd}$, and if the gear position is $3^{rd}$, a determination is made in a step 13 as to whether or not the data for $3^{rd}$ match the values of the map (in this case, the type C map, for example, is given selection priority) selected by calculating the number of teeth of the meter driven gear. If the data and values match, the T/M type is confirmed 61 as type C. If, in step 13, the data and values do not match (no), the type D map is referenced in a step 14 and a determination is made as to whether or not a match is made in the type D map. If a match is made (yes), the T/M type is confirmed 62 as type D and the type D map is selected.

Determination in the $6^{th}$ gear position is not illustrated in this flow, but a determination may be performed in $6^{th}$.

According to the present invention as described above, a gear stage is not estimated using a value obtained by dividing the output of sensors by a time element and speed-converting the resultant figure, but rather is estimated using the number of pulses outputted by the sensors itself (a so-called pulse generation value). When this estimation is performed, a map used for estimating the gear stage of the transmission is stored in advance in the ECU 16, and at the time of factory shipping or the like, the meter gear ratio is learned, or in this embodiment the number of teeth of the driven gear is determined. Then, the gear position is determined from the map based on the number of teeth of the driven gear on the basis of the number of pulses generated by the transmission rotation sensor, and thus complicated operations performed conventionally to input transmission data into the ECU 16 for each meter gear ratio can be eliminated and adjustments using the correction coefficient α upon installment of the pulse matching unit become unnecessary.

Also in this embodiment, once the meter gear ratio has been learned and a map to be used has been selected, a flag is raised inside the ECU 16. By performing a breakdown diagnosis upon confirmation that the flag has been raised, the gear stage can be accurately detected even when the gear position sensor 24 breaks down.

Note that embodiments of the present invention are not limited to that described above. In the embodiment described above, an automatic clutch and a manual transmission are combined, but the clutch may be manual and the transmission may be automatic. Basically, the present invention may be applied to any device requiring transmission gear stage detection. The present invention may also be applied to devices other than a vehicle power transmission device.

In the embodiment described above, the unitary number of vehicle speed pulses was set at twenty-five pulses per one revolution (a 360° phase), but this may be appropriately modified to two revolutions (a 720° phase) or a half revolution (a 180° phase), for example. If this is set generally at N revolutions, then an identical result is obtained by multiplying N by both sides of equations (1) through (3), (2)', and (3)'. Hence the method described above is substantially unchanged, and only the value of the counted transmission pulse number (FIG. 13b) changes.

In the embodiment described above, the output shaft side pulse (vehicle speed pulse) of the transmission is set as a standard and the gear stage is specified by the input shaft side pulse number when the unitary number (twenty-five) of output shaft side pulses has been counted. However, this may be reversed such that the input shaft side pulse (transmission pulse) is used as the standard.

In the embodiment described above, the transmission rotation sensor 20 provided on the countershaft side is set as input shaft side pulse generating means and the number of teeth passed through of the input counter gear 12 is counted. However, these means may be constituted by a sensor provided on the input shaft side and the number of teeth passed through of the input main gear 11 may be counted.

The "Gear Stage Detection Device and Gear Stage Detection Method" described in the present specification, claims, and drawings correspond to those described in Japanese Patent Applications 2002-035843 and 2002-039119.

What is claimed is:

1. A gear stage detection device comprising:
   output shaft side pulse generating means for generating a pulse in a number which corresponds to a rotary phase of an output shaft of a transmission (T/M);
   input shaft side pulse generating means for generating a pulse in a number which corresponds to a rotary phase of an input shaft of said transmission (T/M); and
   gear stage determining means for determining the current gear stage by inputting the output shaft side pulse and input shaft side pulse generated respectively by said pulse generating means, counting a number of one pulse when a unitary number of the other pulse has been reached, and comparing the counted number of the one pulse with the unitary number of the other pulse which is predetermined for each gear stage of said transmission (T/M).

2. The gear stage detection device according to claim 1, wherein said one pulse is said input shaft side pulse and said other pulse is said output shaft side pulse.

3. A gear stage detection device comprising:
   a vehicle speed sensor for generating a vehicle speed pulse in a number which corresponds to a rotary phase of an output shaft of a transmission (T/M), said sensor being rotationally driven by said output shaft via a meter gear;
   a transmission rotation sensor for generating a transmission pulse in a number which corresponds to a rotary phase of an input shaft of said transmission (T/M); and
   gear stage determining means which input said vehicle speed pulse and transmission pulse respectively, store in advance a gear ratio of each gear stage of said transmission (T/M), a gear ratio of said meter gear, and a number of teeth of an input main gear of said transmission (T/M), count the number of transmission pulses generated by said transmission rotation sensor during the generation of a predetermined unitary number of vehicle speed pulses by said vehicle speed sensor, and determine the current gear stage on the basis of at least the counted transmission pulse number, and the pre-stored gear ratio of each gear stage, gear ratio of said meter gear, and number of teeth of said input main gear.

4. The gear stage detection device according to claim 3, wherein said unitary number is the number of pulses generated during one revolution of said vehicle speed sensor, and
said gear stage determining means insert said counted transmission pulse number and successively insert the gear ratio of each gear stage into the following equation 1×(gear ratio of meter gear )×(gear ratio of each gear stage)× (number of teeth of input main gear)=(counted transmission pulse number)

such that the resultant gear stage upon the substantial establishment of said equation is determined to be the current gear stage.

5. The gear stage detection device according to claim 3, wherein said gear stage determining means input said vehicle speed pulse via a pulse matching unit, said pulse matching unit being a device for adjusting the time interval of the vehicle speed pulse inputted therein from said vehicle speed sensor using a predetermined correction coefficient and then outputting said pulse to said gear stage determining means, such that the current gear stage is also determined on the basis of said correction coefficient.

6. A gear stage detection device comprising:
   a vehicle speed sensor for generating a vehicle speed pulse in a number which corresponds to a rotary phase of an output shaft of a transmission (T/M), said sensor being rotationally driven by said output shaft via a meter gear;
   a transmission rotation sensor for generating a transmission pulse in a number which corresponds to a rotary phase of an input shaft of said transmission (T/M); and gear stage determining means which input said vehicle speed pulse and transmission pulse respectively, store in advance the gear ratio of each gear stage of said transmission (T/M) and a predetermined value obtained by multiplying the number of teeth of an input main gear of said transmission (T/M) by the gear ratio of said meter gear, count the number of transmission pulses generated by said transmission rotation sensor during the generation of a predetermined unitary number of vehicle speed pulses by said vehicle speed sensor, and determine the current gear stage on the basis of at least the counted transmission pulse number, the gear ratio of each gear stage, and said predetermined value.

7. The gear stage detection device according to clam 6, wherein said unitary number is the number of pulses generated during one revolution of said vehicle speed sensor, and said gear stage determining means insert said counted transmission pulse number and successively insert the gear ratio of each gear stage into the following equation (predetermined value)=(counted transmission pulse number)/(gear ratio of each gear stage)

such that the resultant gear stage upon the substantial establishment of said equation is determined to be the current gear stage.

8. The gear stage detection device according to claim 6, wherein said unitary number is the number of pulses generated during one revolution of said vehicle speed sensor, and said gear stage determining means compare a value obtained by dividing said counted transmission pulse number by said predetermined value to the gear ratio of each gear stage and determine a gear stage having a gear ratio which substantially matches said value to be the current gear stage.

9. The gear stage detection device according to claim 6, wherein said gear stage determining means input said vehicle speed pulse via a pulse matching unit, said pulse matching unit being a device for adjusting the time interval of the vehicle speed pulse inputted therein from said vehicle speed sensor using a predetermined correction coefficient and then outputting said pulse to said gear stage determining means, such that the current gear stage is also determined on the basis of said correction coefficient.

10. A gear stage detection device comprising:

a vehicle speed sensor for generating a pulse in a number which corresponds to a rotary phase of an output shaft of a transmission (T/M), said sensor being rotationally driven by said output shaft via a meter gear;

a transmission rotation sensor for generating a pulse in a number which corresponds to a rotary phase of an input shaft of said transmission (T/M); and gear stage determining means which input the pulses respectively generated by said sensors, count a number of one pulse when a unitary number of the other pulse has been reached, and determine the current gear stage from the counted one pulse number, wherein data regarding the counted value of said one pulse number based on the gear ratio of each gear stage of said transmission (T/M) and a plurality of gear ratios of the meter gear are stored as a map in advance in said gear stage determining means, a gear ratio of the meter gear installed in the transmission (T/M) is specified from said map, and the current gear stage is determined from the map of said counted value data which corresponds to said specified meter gear ratio.

11. The gear stage detection device according to claim 10, wherein the number of transmission pulses generated by said transmission rotation sensor upon the generation of the unitary number of pulses by said vehicle speed sensor is stored in said map for each gear stage of said transmission (T/M), and this transmission pulse number is stored therein for each of a plurality of values (Nd) obtained by dividing the transmission pulse number by the transmission gear ratio in accordance with the gear ratio of said meter gear.

12. The gear stage detection device according to claim 11, wherein the value of Nd is determined by dividing the transmission pulse number inputted from said transmission rotation sensor by the gear ratio of the current gear stage, the meter gear ratio is determined from the value of Nd, and the current gear stage is determined from the map which corresponds to the determined meter gear ratio.

13. The gear stage detection device according to claim 12, wherein a pulse matching unit for correcting the signal of said vehicle speed sensor on the basis of differences in tire radius of movement, final gear ratio, and so on, is connected between said vehicle speed sensor and said gear stage determining means, and the signal of said vehicle speed sensor corrected by said pulse matching unit and a correction coefficient ($\alpha$) are inputted into said gear stage determining means, whereby the meter gear ratio and current gear stage are determined from a map by multiplying said correction coefficient ($\alpha$) by the transmission pulse number.

14. The gear stage detection device according to claim 12, wherein transmission pulse number data for a plurality of types of transmission (T/M) in which the gear ratios of the transmission (T/M) differ at predetermined stages and match at the other stages are stored in said map, the meter gear ratio is determined when the transmission (T/M) is in the other gear stages, the type of transmission (T/M) is then determined from the transmission pulse number at the predetermined stages, and the current gear stage is determined using the map of the determined type.

15. The gear stage detection device according to claim 10, wherein, following the determination of the meter gear ratio using said map, said gear stage determining means raise a flag indicating that the map based on the meter gear ratio has been learned, and a judgment as to a breakdown of a gear position sensor is performed only when the flag is raised.

16. A gear stage detection method for detecting a current gear stage by generating a pulse in a number which corresponds to a rotary phase of an output shaft of a transmission (T/M), generating a pulse in a number which corresponds to a rotary phase of an input shaft of said transmission (T/M), counting a number of one of said pulses when a unitary number of the other pulse has been reached, and comparing the counted number of the one pulse with the unitary number of the other pulse which is predetermined for each gear stage of said transmission (T/M).

* * * * *